(12) United States Patent
Wang et al.

(10) Patent No.: US 10,491,123 B2
(45) Date of Patent: Nov. 26, 2019

(54) MODULAR PARALLEL TECHNIQUE FOR RESONANT CONVERTER

(71) Applicant: Murata Manufacturing Co., Ltd., Nagaokakyo-shi, Kyoto-fu (JP)

(72) Inventors: Hongliang Wang, Markham (CA); Yang Chen, Markham (CA); Yan-Fei Liu, Markham (CA); Jahangir Afsharian, Markham (CA); Zhihua Yang, Markham (CA); Bing Gong, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/757,552

(22) PCT Filed: Sep. 16, 2016

(86) PCT No.: PCT/US2016/052293
§ 371 (c)(1),
(2) Date: Mar. 5, 2018

(87) PCT Pub. No.: WO2017/049191
PCT Pub. Date: Mar. 23, 2017

(65) Prior Publication Data
US 2019/0044447 A1    Feb. 7, 2019

Related U.S. Application Data

(60) Provisional application No. 62/220,460, filed on Sep. 18, 2015.

(51) Int. Cl.
*H02M 3/335* (2006.01)
*H02M 3/28* (2006.01)

(52) U.S. Cl.
CPC ....... *H02M 3/285* (2013.01); *H02M 3/33592* (2013.01)

(58) Field of Classification Search
CPC ............ H02M 3/335; H02M 3/33576; H02M 3/33592; H02M 3/3376
See application file for complete search history.

(56) References Cited

U.S. PATENT DOCUMENTS 5,946,206 A     8/1999  Shimizu et al.
7,072,194 B2 *  7/2006  Nayar ..................... H02J 7/35
                                                363/65

(Continued)

FOREIGN PATENT DOCUMENTS

CN    102611315 A    7/2012
JP    10-229676 A    8/1998

(Continued)

OTHER PUBLICATIONS

Official Communication issued in International Patent Application No. PCT/US2016/052293, dated Dec. 22, 2016.

(Continued)

*Primary Examiner* — Jeffrey A Gblende
*Assistant Examiner* — Nusrat Quddus
(74) *Attorney, Agent, or Firm* — Keating & Bennett, LLP

(57) ABSTRACT

An LLC resonant converter includes a first phase with a first primary circuit and a second phase with a second primary circuit. The first primary circuit includes a first shared inductor, and the second primary circuit includes a second shared inductor. The first and second shared inductors are connected in parallel with each other. The first and second primary circuits do not include a capacitor that is connected in parallel with each other.

5 Claims, 32 Drawing Sheets

(56) References Cited

U.S. PATENT DOCUMENTS

| | | | |
|---|---|---|---|
| 7,596,007 B2 | 9/2009 | Phadke et al. | |
| 7,623,363 B2* | 11/2009 | Nakanishi | H02M 3/3353 363/65 |
| 7,696,733 B2* | 4/2010 | Osaka | H02M 3/33561 307/17 |
| 8,542,501 B2* | 9/2013 | Kyono | H02M 3/285 363/21.02 |
| 8,842,448 B2* | 9/2014 | Ye | H02M 3/33569 363/21.02 |
| 8,929,109 B2* | 1/2015 | Chang | H02M 3/3376 323/267 |
| 9,236,808 B1* | 1/2016 | Hung | H02M 3/33576 |
| 9,343,970 B2* | 5/2016 | Yan | H02M 3/33569 |
| 2008/0298093 A1 | 12/2008 | Jin et al. | |
| 2010/0328968 A1 | 12/2010 | Adragna et al. | |
| 2012/0063177 A1* | 3/2012 | Garrity | H02J 3/383 363/37 |
| 2013/0148384 A1 | 6/2013 | Kim et al. | |
| 2013/0250623 A1 | 9/2013 | Xu et al. | |
| 2015/0103561 A1* | 4/2015 | Dai | H02M 3/3353 363/17 |
| 2015/0357921 A1* | 12/2015 | Li | H02M 3/285 363/21.02 |
| 2016/0141964 A1* | 5/2016 | Yu | H02M 3/33507 363/21.02 |
| 2017/0085189 A1* | 3/2017 | Madsen | H02M 3/33546 |

FOREIGN PATENT DOCUMENTS

| | | | |
|---|---|---|---|
| JP | 11-285249 A | 10/1999 | |
| JP | 2001-078449 A | 3/2001 | |
| KR | 10-2013-0092529 A | 8/2013 | |

OTHER PUBLICATIONS

Yi et al., "A Simple and novel two phase interleaved Llc series resonant converter employing a phase of the resonant capacitor", IEEE Energy Conversion Congress and Exposition, Nov. 2009, pp. 754-757.

Orietti et al., "Current Sharing in Three-Phase LLC Interleaved Resonant Converter", Energy Conversion Congress and Exposition, IEEE, 2009, pp. 1145-1152.

Kim et al., "Load Sharing Characteristic of Two-Phase Interleaved LLC Resonant Converter with Parallel and Series Input Structure", Energy Conversion Congress and Exposition, IEEE, 2009, pp. 750-753.

Jin et al., "Multi-Phase Multi-Level LLC Resonant Converter with Low Voltage Stress on the Primary-Side Switches", Energy Conversion Congress and Exposition, 2014, pp. 4704-4710.

Orietti et al., "Two-Phase Interleaved LLC Resonant Converter With Current-Controlled Inductor", Power Electronics Conference, 2009, pp. 298-304.

Hu et al., "An Interleaved LLC Resonant Converter Operating at Constant Switching Frequency", IEEE Transactions on Power Electronics, vol. 29, No. 6, Jun. 2014, pp. 2931-2943.

Official Communication issued in Chinese Patent Application No. 201680053680.0, dated Jul. 12, 2019.

\* cited by examiner

MODULAR PARALLEL TECHNIQUE FOR RESONANT CONVERTER

BACKGROUND OF THE INVENTION

1. Field of the Invention

The present invention relates to high-efficiency power supplies and similar devices.

2. Description of the Related Art

A multi-phase, parallel resonant converter is a good choice for high-efficiency, high-power DC/DC applications, such as telecommunication power supplies and similar applications. Load current sharing is a key issue in such applications. Interleaved, parallel power converters can provide an output with a small ripple. However, interleaved, parallel power supplies need additional metal-oxide-semiconductor field-effect transistors (MOSFETs), and therefore, the cost of interleaved, parallel power supplies is higher, and an additional gate-drive circuit is needed. The dynamic performance of interleaved, parallel power is not very good when the load is changing. In particular, at light loads, interleaved, parallel power can be inefficient because of switching losses of all of the MOSFETs.

Known LLC resonant converters are attractive for isolated DC/DC applications, such as flat-panel TVs, laptop adapters, server computers, etc. because of their attractive features: smooth waveforms, high efficiency, and high power density. Known LLC resonant converters have been widely used due to the high efficiency as a result of zero-voltage switching (ZVS) of the primary-side MOSFETs and of zero-current switching (ZCS) of the secondary-side diodes in which the secondary-side diodes are switched between current-flowing and current-blocking states so that the diode current decreases to zero before the next half period. For high-power applications, the current stress on the power devices increases with the power rating. Connecting multiple converters, or phases or stages, in parallel is a good technique to address this problem of current stress. But, because of the tolerances of resonant components, the resonant frequency of each individual converter will be different. Thus, the output currents of the different phases will be different. A small component tolerance, e.g., such as less than 5%, can cause significant current imbalance as shown, for example, in FIG. 4. Therefore, current sharing is needed to achieve multiphase operation.

FIG. 30 shows a known two-phase converter with phases 1 and 2. Each phase includes a transformer with primary and secondary windings. The transformer turns ratio is n. A primary circuit is connected to the primary winding, and a secondary circuit is connected to the secondary winding.

The primary circuit of phase 1 includes primary switches Q11, Q12 connected in series and includes resonant inductor Lr, resonant capacitor Cr, and magnetizing inductor Lm connected in series. The magnetizing inductor Lm is connected in parallel with the primary winding. The current $i_{Lr1}$ is the resonant current in phase 1. The primary circuit of phase 2 includes primary switches Q21, Q22 connected in series and includes resonant inductor aLr, resonant capacitor bCr, and magnetizing inductor cLm connected in series. The values a, b, c indicate that the resonant parameters for these two phases are different. The magnetizing inductor cLm is connected in parallel with the primary winding. The current $i_{Lr2}$ is the resonant current in phase 2. The primary circuits of phases 1 and 2 are connected to the voltage input Vin.

The secondary circuit of phase 1 includes a rectifying stage including synchronous rectifiers SR11, SR12 connected to the secondary winding and an output capacitor Co1 connected to the rectifying stage. The current $i_{rect1}$ is the current through the rectifying stage. The current $i_{o1}$ is the load current of phase 1. The secondary circuit of phase 2 includes a rectifying stage including synchronous rectifiers SR21, SR22 connected to the secondary winding and an output capacitor Co2 connected to the rectifying stage. The current $t_{rect2}$ is current through the rectifying stage. The current $i_{o2}$ is the load current of phase 2. The secondary circuits of phases 1 and 2 are connected to the output Vo. The current $i_o$ is the output current. Resistance Ro represents the resistance of the load.

A mathematic model of the LLC converter is needed for analyzing the current sharing characteristics. For simplicity, a two-phase LLC converter without using a sharing method is shown in FIG. 30. FIG. 31 is the equivalent circuit based on fundamental harmonic analysis (FHA). In steady-state, the load resistor Ro is separated Ro1 and Ro2 according to each load current $i_{o1}$, $i_{o2}$. The primary-side equivalent ac resistors Rac1, Rac2 are:

$$\begin{cases} R_{o1} = \frac{1}{k} R_o, R_{o2} = \frac{1}{(1-k)} R_o, k \in [0, 1] \\ R_{ac} = \frac{8n^2}{\pi^2} R_o, R_{ac1} = \frac{8n^2}{\pi^2} R_{o1}, R_{ac2} = \frac{8n^2}{\pi^2} R_{o2} \end{cases} \quad (1)$$

where k is the impedance sharing error that is between 0 and 1. If k=0.5, then the load power is equally shared by the two phases. If k=0 or 1, then the load power can only be provided by one of the phases.

Three known current-sharing methods have been used with multiphase LLC converters. The first known current-sharing method is the active method which adjusts the equivalent resonant capacitor or inductor to compensate for the components' tolerances using additional MOSFETs as shown in FIGS. 27 and 28. This method can achieve excellent load-sharing performance. An example of this known method using a switched capacitor is shown in FIG. 27.

The known current-sharing method using switched capacitors shown in FIG. 27. Each phase has a switched capacitor. The switched capacitor includes the capacitor Cs with two transistors connected in series with each other and connected in parallel across the capacitor Cs. The two transistors define an additional switch that charges or discharges the capacitor Cs. The equivalent capacitor is a variable capacitor with a changing duty ratio.

The known current-sharing method using a variable inductor is shown in FIG. 28. The converter in FIG. 28 is similar to the converter in FIG. 27, except that the switched capacitor is replaced with variable inductors Lst1, Lst2. The variable inductors Lst1, Lst2 include an extra circuit with additional switches that control the coupled windings of the variable inductors Lst1, Lst2.

This known current-sharing method uses an additional circuit, which includes switches, a passive element such as a capacitor or an inductor, and a detecting current circuit. The circulated current can be controlled by changing the resonant frequency based on the additional circuit. The equivalent resonant inductance or capacitance is changed by the variable inductor or the switched capacitor in the additional circuit. Thus, the resonant frequency is changed as the inductance or capacitance is changed. These known current-sharing methods with the switched capacitor and the variable inductor suffer from high cost, complex control, and inferior dynamic performance because of the required sensing circuit and of the need to control the additional switches.

A second known current-sharing method is the DC-voltage, self-balanced method that uses series DC-bus capacitors as shown in FIG. 29. The series DC-bus capacitors of the two-phase converter shown in FIG. 29 includes two capacitors C1, C2 connected in series, which can share the current by automatically adjusting the voltage of the two series capacitors C1, C2. Capacitor C1 is connected in parallel across primary switches Q11, Q12, and capacitor C2 is connected in parallel across primary switches Q21, Q22. The two large series DC capacitors C1, C2 are connected in series to share the input DC voltage. FIG. 29 shows a two-phase LLC converter to explain the principle. The mid-point voltage is changed according to the power of the two phases. The input voltage of the first module is the voltage of the capacitor C1, and the input voltage of the second module is the voltage of the capacitor C2. The input voltage of each module can be changed to balance power by the series DC capacitor. The output voltage is same for each of the modules; thus, the current can be shared. Thus, the converter has low cost and good load-current sharing performance.

To balance the capacitor voltage, it is better to use a two-phase LLC converter. It is difficult to use additional modules. It is hard to achieve a modular design with the second known current-sharing method because the DC voltage stress is reduced as the number of modules increases. The total input voltage and output voltage is constant. When two modules are used in the series DC capacitor current-sharing method, the input voltage of each of the modules is about half of the total input voltage. When three modules are used, the input voltage of each module is about a third of the total input voltage. When the input voltage is low, the design of the LLC converter will not be optimized because the resonant current (i.e., the input current) will be increased. In addition, when one module fails, the input voltage for the other modules will have a large change, which is not desirable.

A third known current-sharing method is based on a three-phase, three-wire structure for three-phase LLC converters based on a 120°-phase-shift method, which has good load-current sharing near the resonant frequency as all of the three-phase resonant currents are zero. But this third known current-sharing method is only suitable for three LLC converter phases connected in parallel. The load current will not share with more than three phases.

Therefore, the known current-sharing methods do not provide cost effective, flexible current sharing for multiphase LLC resonant converters.

SUMMARY OF THE INVENTION

To overcome the problems described above, preferred embodiments of the present invention provide an improved LLC resonant converter and method that makes it possible to automatically share the load current without additional cost and without additional control. Preferred embodiments of the present invention provide a common-inductor, multiphase LLC resonant converter that achieves automatic load sharing. The resonant inductor in each phase is connected in parallel, which allows the automatic load-current sharing. The topology of the preferred embodiments of the present invention is simple, and no additional cost and complex control method are needed. The common-inductor current sharing method can be expanded to any number of phases.

According to a preferred embodiment of the present invention, an LLC resonant converter includes a voltage input, a voltage output, a first phase, and a second phase. The first phase includes a first transformer with first primary and first secondary windings, a first primary circuit connected to the voltage input and the first primary winding, and a first secondary circuit connected to the first secondary winding and the voltage output. The first primary circuit includes a first resonant capacitor, a first magnetizing inductor connected in parallel across the first primary winding, and a first resonant inductor. The first resonant capacitor, the first magnetizing inductor, and the first resonant inductor are connected in series. The first secondary circuit includes a first rectifying circuit. The second phase includes a second transformer with second primary and second secondary windings, a second primary circuit connected to the voltage input and the second primary winding, and a second secondary circuit connected to the second secondary winding and the voltage output. The second primary circuit includes a second resonant capacitor, a second magnetizing inductor connected in parallel across the second primary winding, and a second resonant inductor. The second resonant capacitor, the second magnetizing inductor, and the second resonant inductor are connected in series. The second secondary circuit includes a second rectifying circuit. The first primary circuit includes a first shared inductor, and the second primary circuit includes a second shared inductor. The first and second shared inductors are connected in parallel with each other. The first and second primary circuits do not include a capacitor that is connected in parallel with each other.

The first and second rectifying circuits preferably include synchronous rectifiers. Preferably, the first phase includes a first output capacitor, and the second phase includes a second output capacitor. Preferably, the LLC resonant converter further includes at least one additional phase including at least one additional shared inductor, and the at least one additional shared inductor is connected in parallel with the first and second shared inductors.

Preferably, the first shared inductor includes first and second ends, the second shared inductor includes first and second ends, the first ends of the first and second shared inductors are directly connected to each other, and the second ends of the first and second shared inductors are directly connected to each other.

Preferably, the first shared inductor is the first resonant inductor, and the second shared inductor is the second resonant inductor.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 32:
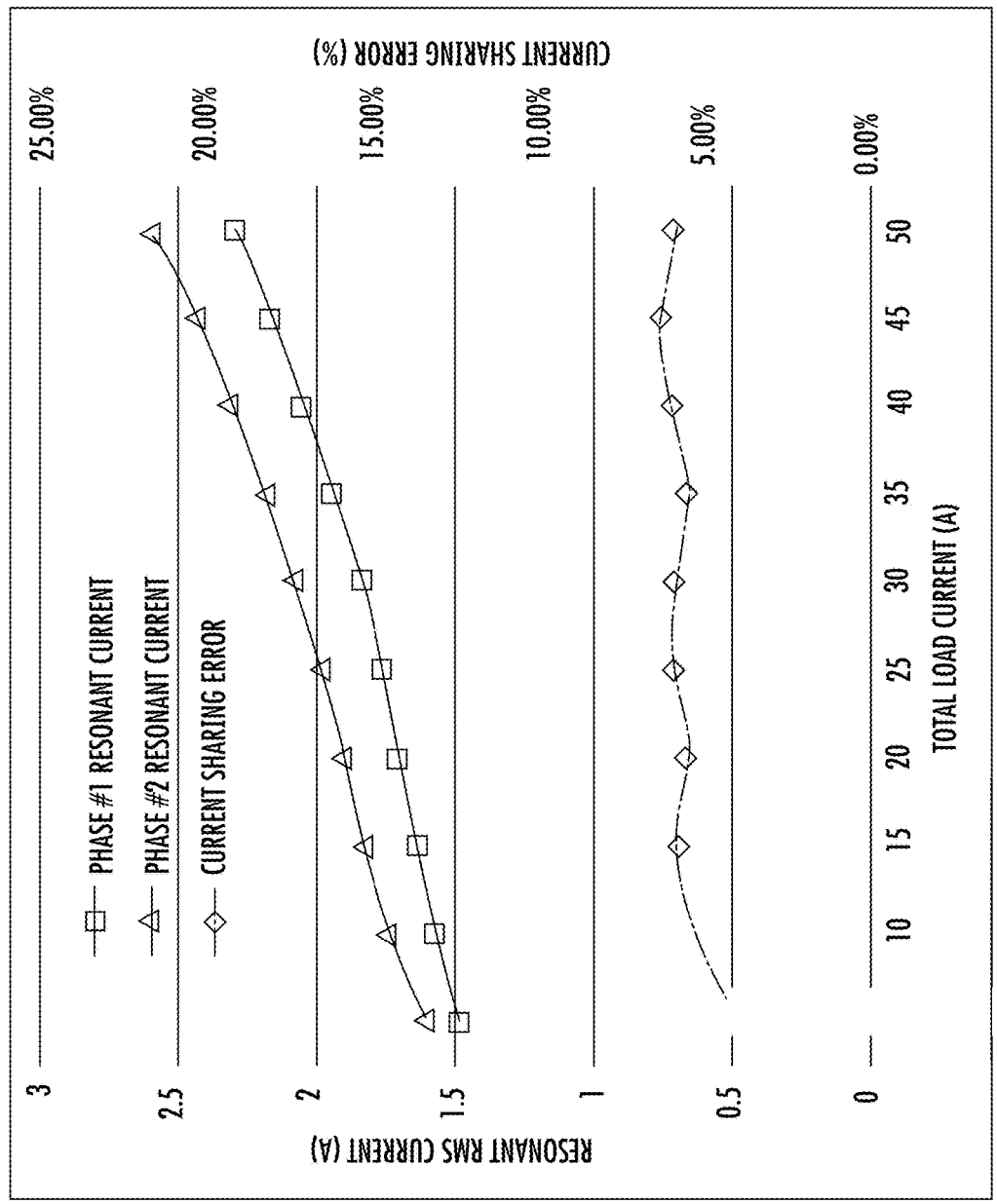
FIG. 32 shows the resonant currents of a two-phase converter using a common-capacitor current-sharing method.

In the common-inductor current-sharing method for multi-phase LLC resonant converter of the preferred embodiments of the present invention, the series resonant inductors in each phase are connected in parallel. No additional components are needed to achieve current sharing. Analysis of the common-inductor current-sharing method shows that the relative resonant current is significantly reduced. Simulated and experimental results show that the resonant current error is reduced by 63 times and is only 0.44% at 600 W total load power. As a comparative example, a common-capacitor current-sharing method is also discussed. The common-capacitor current-sharing method is only able to achieve a resonant current error of 5% at 600 W total load power as shown in FIG. 32. The LLC resonant converter shown in FIG. 30 can only achieve a resonant current error of 27% at 600 W total load power.

Figure 1:
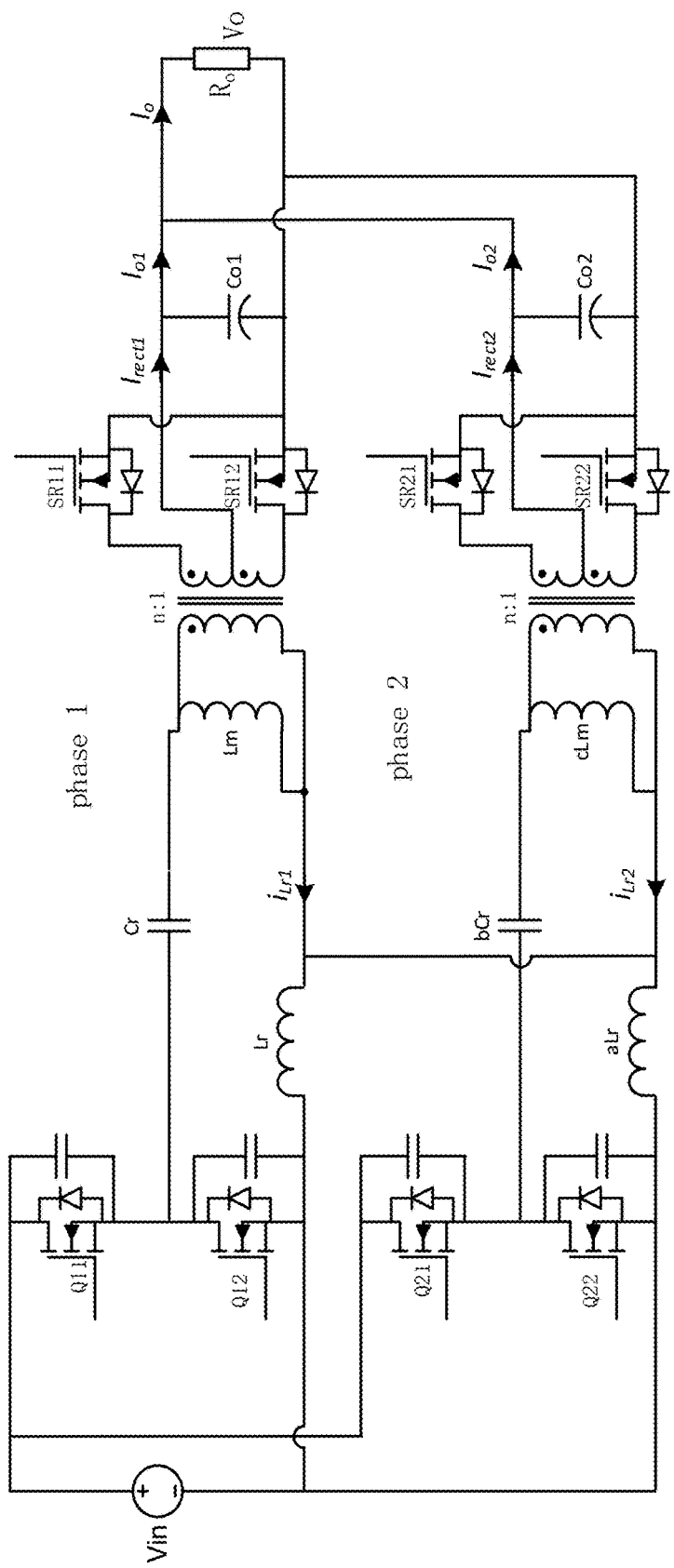
FIG. 1 shows a two-phase LLC resonant converter with current sharing according to a first preferred embodiment of the present invention.
Figure 2:
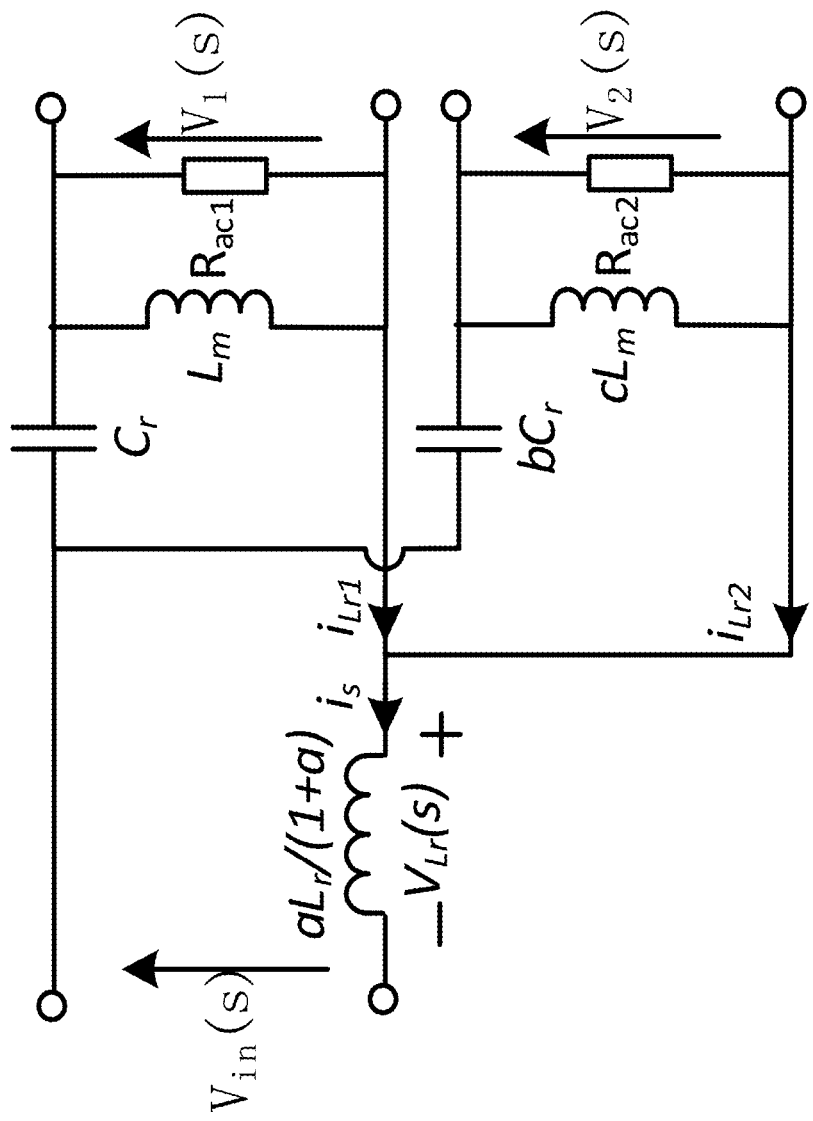
FIG. 2 shows an FHA equivalent circuit of the converter shown in FIG. 1.

FIG. 1 shows a two-phase LLC resonant converter using the common-inductor current-sharing method. FIG. 2 shows the FHA equivalent circuit. The converter includes phases 1 and 2. Each phase includes a transformer with primary and secondary windings. The transformer turns ratio is n. A primary circuit is connected to the primary winding, and a secondary circuit is connected to the secondary winding.

The primary circuit of phase 1 includes primary switches Q11, Q12 connected in series and includes resonant inductor Lr, resonant capacitor Cr, and magnetizing inductor Lm connected in series. The magnetizing inductor Lm is connected in parallel with the primary winding. The current $i_{Lr1}$ is the resonant current in phase 1. The primary circuit of phase 2 includes primary switches Q21, Q22 connected in series and includes resonant inductor aLr, resonant capacitor bCr, and magnetizing inductor cLm connected in series. The values a, b, c indicate that the resonant parameters for these two phases are different. The magnetizing inductor cLm is connected in parallel with the primary winding. The current $i_{Lr2}$ is the resonant current in phase 2. The primary circuits of phases 1 and 2 are connected to the voltage input Vin.

The secondary circuit of phase 1 includes a rectifying stage including synchronous rectifiers SR11, SR12 connected to the secondary winding and an output capacitor Co1 connected to the rectifying stage. The current $i_{rect1}$ is the current through the rectifying stage. The current $i_{o1}$ is the load current of phase 1. The secondary circuit of phase 2 includes a rectifying stage including synchronous rectifiers SR21, SR22 connected to the secondary winding and an output capacitor Co2 connected to the rectifying stage. It is possible to use passive diodes instead of active synchronous rectifiers SR21, SR22 to provide a rectified output. The current $i_{rect2}$ is the current through the rectifying stage. The current $i_{o2}$ is the load current of phase 2. The secondary circuits of phases 1 and 2 are connected to the output Vo. The current $i_o$ is the output current. Resistance Ro represents the resistance of the load.

In FIG. 1, the resonant inductors Lr and aLr of the two phases are connected together according to the common-inductor current-sharing method of the preferred embodiments of the present invention. Terminals of the resonant inductors Lr and aLr are directly connected to each other. The resonant capacitors Cr and bCr are not directly connected to each other. The AC voltage angles are always different because of the tolerances in the resonant components. The relationship between the transfer functions is:

$$|V_1(s)|=|V_2(s)| \quad (2)$$

Figure 31:
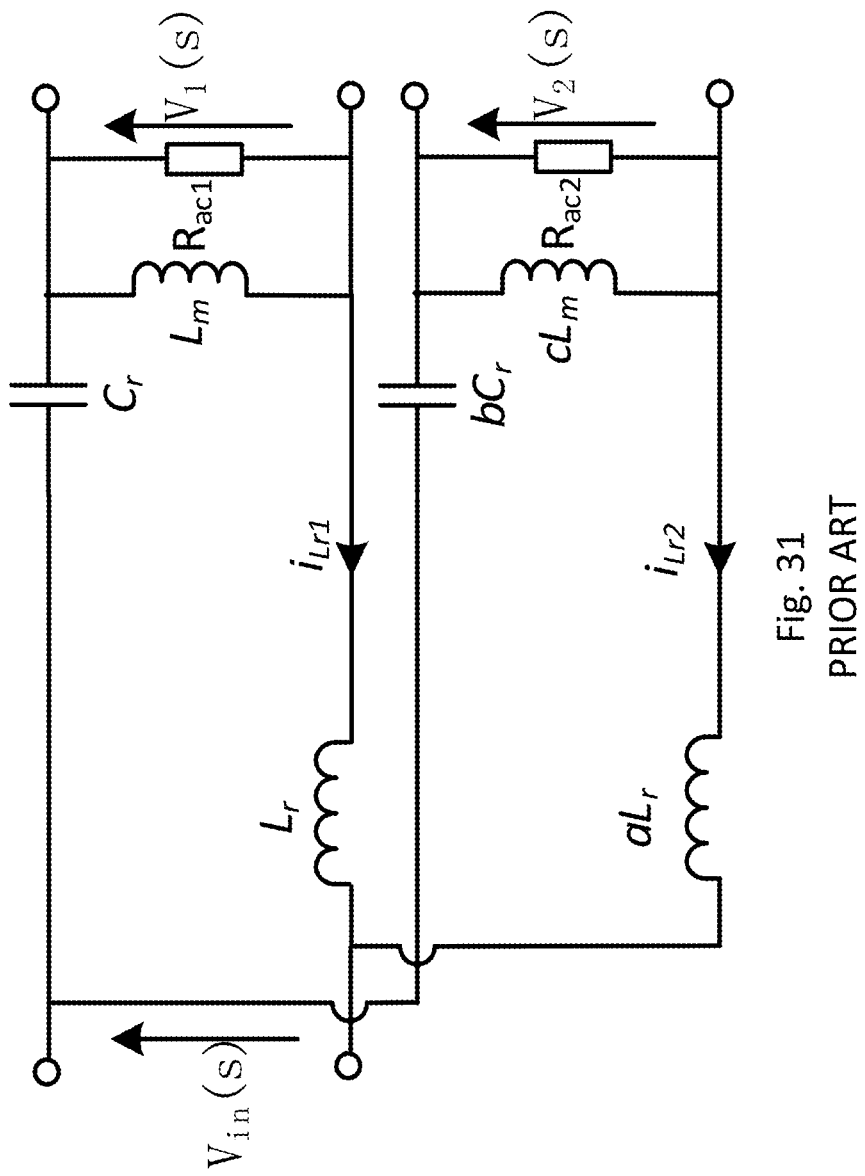
FIG. 31 shows an FHA equivalent circuit of the converter shown in FIG. 30.

According to FIG. 31, the transfer functions $V_1(s)$, $V_2(s)$ are provided by:

$$\begin{cases} V_1(s) = \dfrac{R_{ac1} // sL_m}{R_{ac1} // sL_m + sL_r + 1/sC_r} V_{in}(s) \\ V_2(s) = \dfrac{R_{ac2} // scL_m}{R_{ac2} // scL_m + saL_r + 1/sbC_r} V_{in}(s) \end{cases} \quad (3)$$

Figure 5:
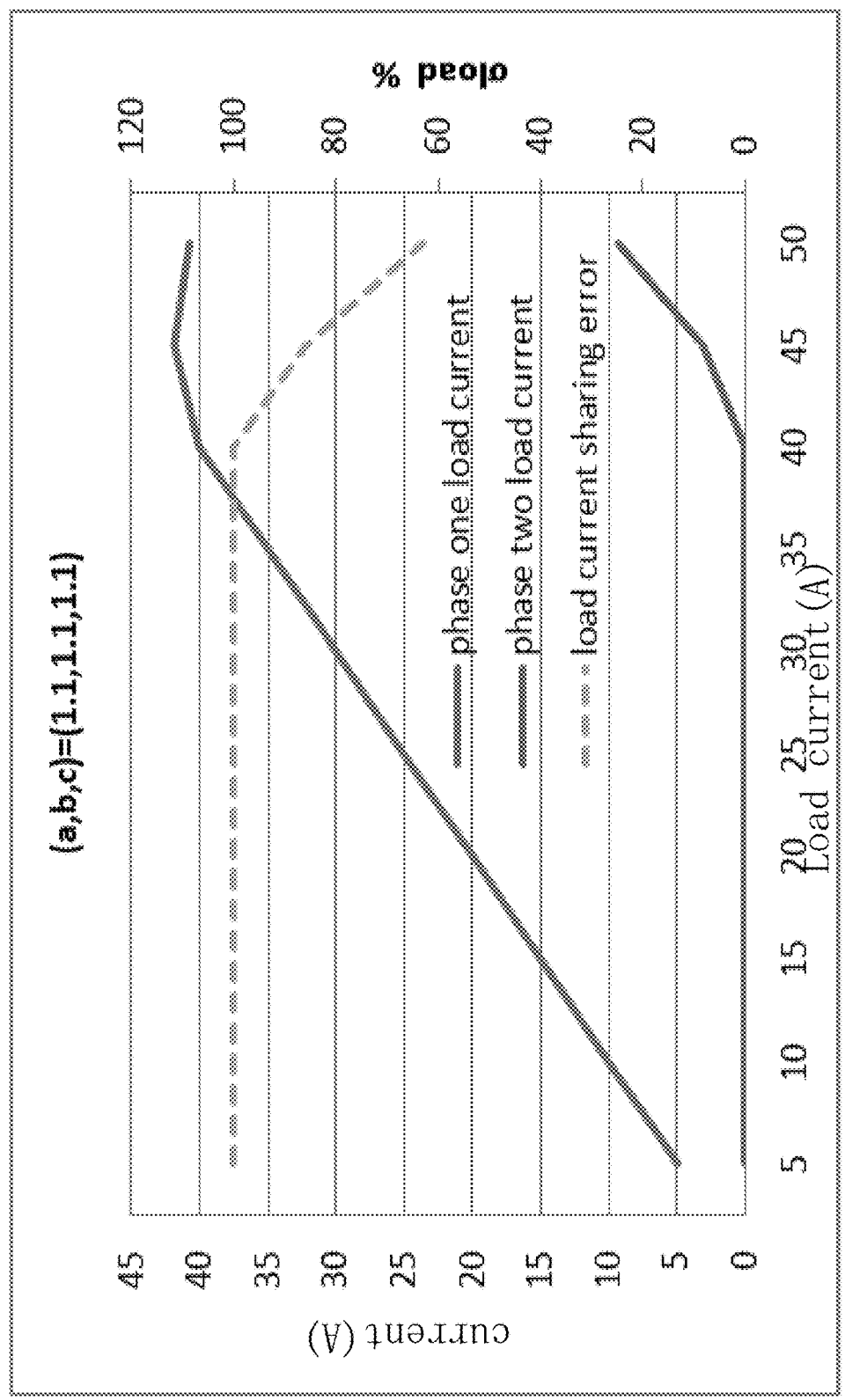

According to the FIG. 5, the transfer functions $V_1(s)$, $V_2(s)$ are provided by:

$$\begin{cases} V_1(s) = \dfrac{R_{ac1} // sL_m}{R_{ac1} // sL_m + 1/sC_r}(V_{in}(s) + V_{Lr}(s)) \\ V_2(s) = \dfrac{R_{ac2} // scL_m}{R_{ac2} // scL_m + 1/sbC_r}(V_{in}(s) + V_{Lr}(s)) \end{cases} \quad (4)$$

According to equations (1) and (2) and either (3) or (4), the follow relationship is found:

$$Ak^2 + Bk + C = 0 \quad (5)$$

For a two-phase LLC resonant converter according to the first preferred embodiment of the present invention, the parameters A, B, C are provided by:

$$\begin{cases} A = \omega^2(1-b^2)c^2 L_m^2 - \omega^4(2ab-2b^2)c^2 L_r L_m^2 C_r + \\ \quad \omega^6(a^2-1)b^2 c^2 L_r^2 L_m^2 C_r^2 \\ B = -2\omega^2 c^2 L_m^2 + 4\omega^4 abc^2 L_r L_m^2 C_r - 2\omega^6 a^2 b^2 c^2 L_r^2 L_m^2 C_r^2 \\ C = \omega^2 c^2 L_m^2 - 2\omega^4 abc^2 L_r L_m^2 C_r + \omega^6 a^2 b^2 c^2 L_r^2 L_m^2 C_r^2 + \\ \quad (1-b^2c^2)R_{ac}^2 - \omega^2[(2ab-2b^2c^2)L_r + (2bc-2b^2c^2)L_m]C_r R_{ac} + \\ \quad \omega^4(ab-bc)[(ab+bc)L_r^2 + 2bcL_r L_m]C_r^2 R_{ac}^2 \end{cases} \quad (6)$$

where $\omega = 2\pi f_s$ and $f_s$ is switching frequency.

Figure 30:
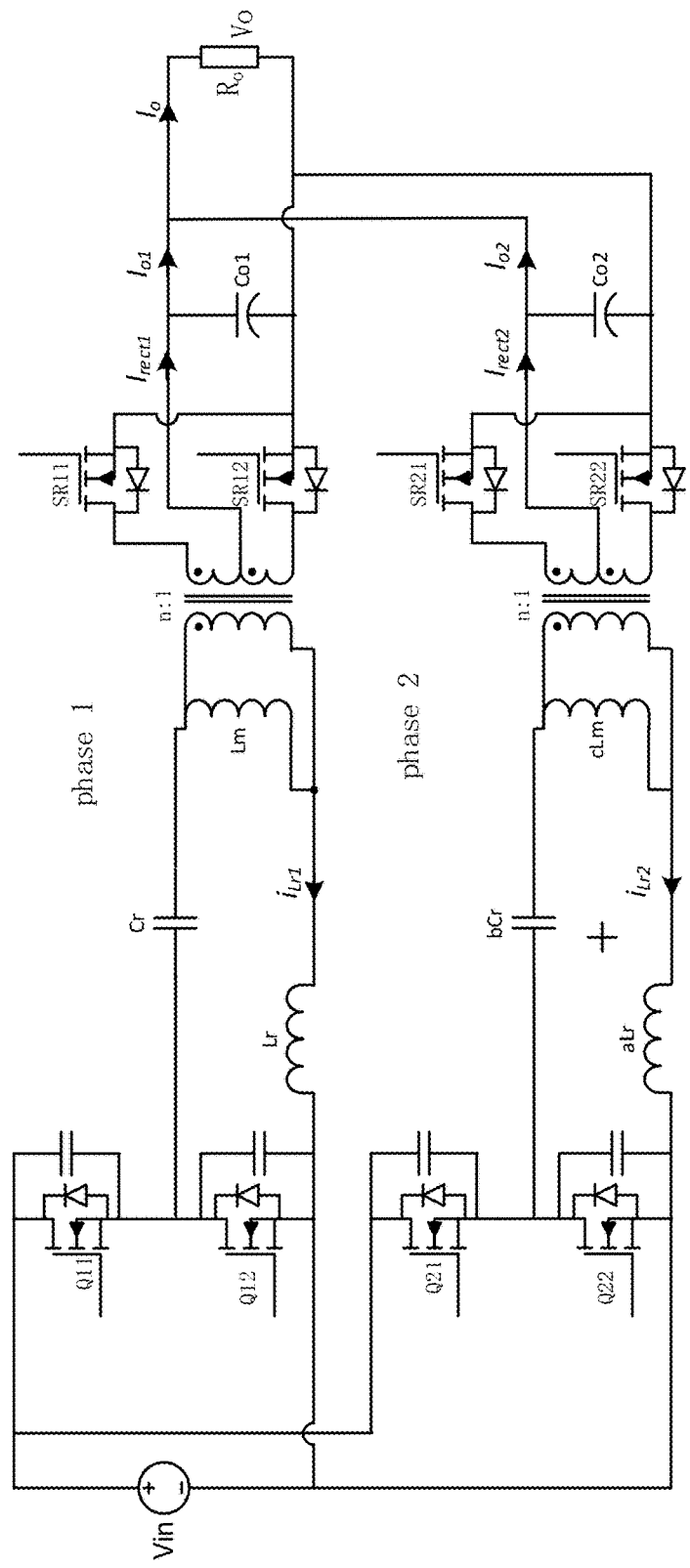
FIG. 30 shows a known two-phase LLC resonant converter.

For a two-phase known LLC converter as shown in FIG. 30, the parameters A, B, C are provided by:

$$\begin{cases} A = \omega^2(1-b^2)c^2 L_m^2 \\ B = -2\omega^2 c^2 L_m^2 \\ C = \omega^2 c^2 L_m^2 + (1-b^2c^2)R^2 - 2\omega^2(bc - b^2c^2)L_{in}C_r R_{ac}^2 \end{cases} \quad (7)$$

The current sharing error k is provided by:

$$k = \begin{cases} -\dfrac{C}{B} & A = 0, B \ne 0 \\ \dfrac{-B \pm \sqrt{B^2 - 4AC}}{2A} & A \ne 0, \sqrt{B^2 - 4AC} \ge 0 \end{cases} \text{ and } k \in [0, 1] \quad (8)$$

The current sharing error k is valid when the current sharing error k is between 0 and 1. If the current sharing error k=0 or k=1, then one of the phases is providing all the power, and the other phase is not providing any power. The conditions of the current sharing error k<0 or k>1 does not exist because this would one of the phases absorbing power. The load current sharing error $\sigma_{load}$ is defined by $$\sigma_{load} = \text{abs}\left(\dfrac{I_{o1} - I_{o2}}{I_{o1} + I_{o2}}\right) = \text{abs}(1-2k), k \in [0, 1] \quad (9)$$

where abs(x) is the absolute value function.

The resonant current sharing error $\sigma_{Resonant}$ is defined by:

$$\sigma_{Resonant} = \dfrac{|\text{rms}(i_{Lr1}) - \text{rms}(i_{Lr2})|}{|\text{rms}(i_{Lr1}) + \text{rms}(i_{Lr2})|} \quad (10)$$

where rms means root mean square.

Table 1 shows parameters of the two-phase LLC converter used in the current sharing analysis. The full load power of each phase is 12 V @25 A. Two load conditions are considered: full load (12 V @50 A) and half load (12 V @25 A).

TABLE 1

(Nominal parameters)

| | |
|---|---|
| Resonant inductor Lr | 29 µH |
| Resonant capacitor Cr | 12 nF |
| Magnetic inductor Lm | 95 µH |
| Transformer ratio n | 20 |
| Resonant frequency fr | 270 KHz |
| Output voltage Vo | 12 V (rated voltage) |
| Total Output load Ro | 0.24 Ω (full power 600 W) |
| | 0.48 Ω (half power 300 W) |

Figure 3:
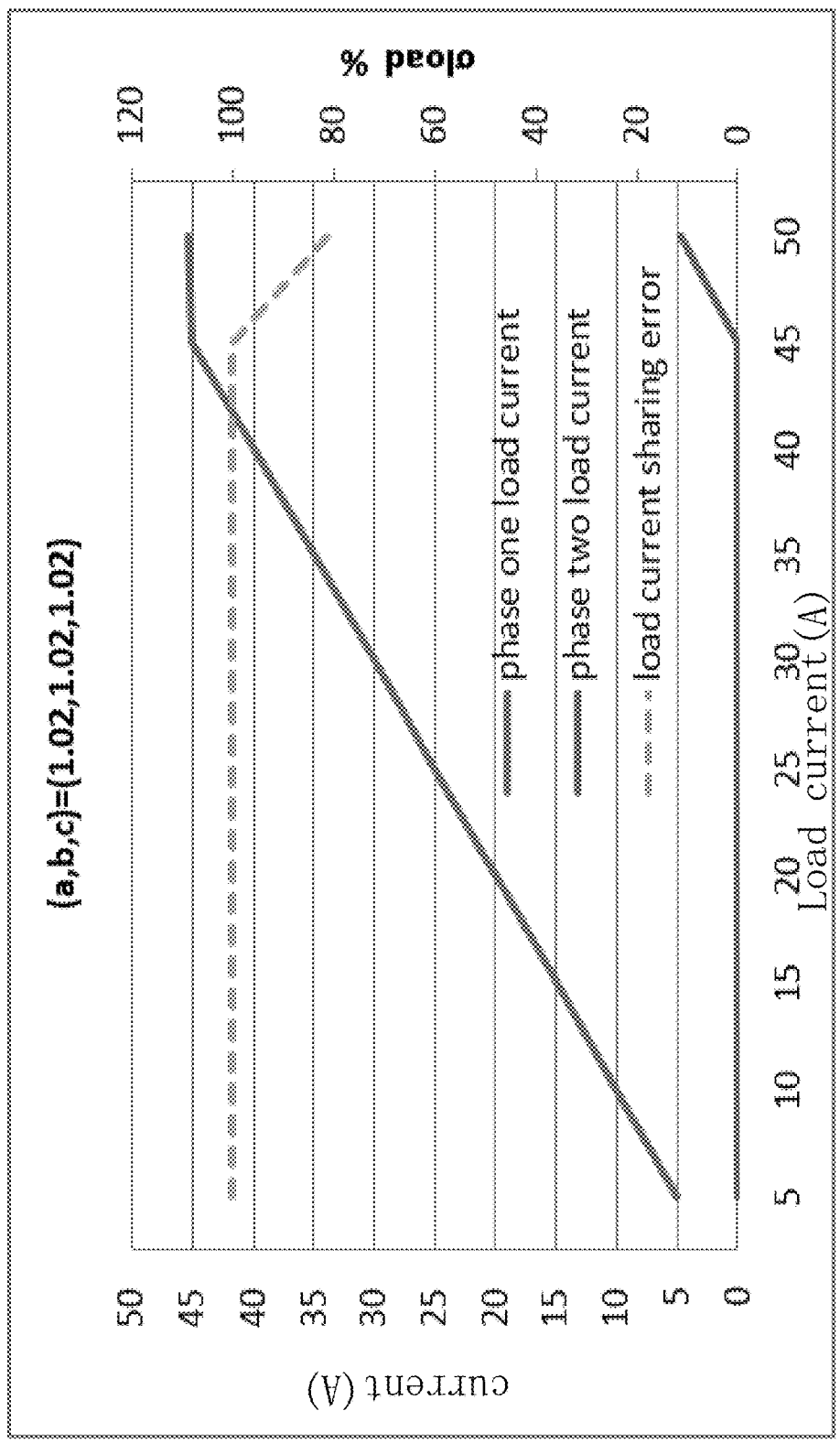
FIGS. 3-5 show load current sharing error for the known converter shown in FIG. 30.
Figure 4:
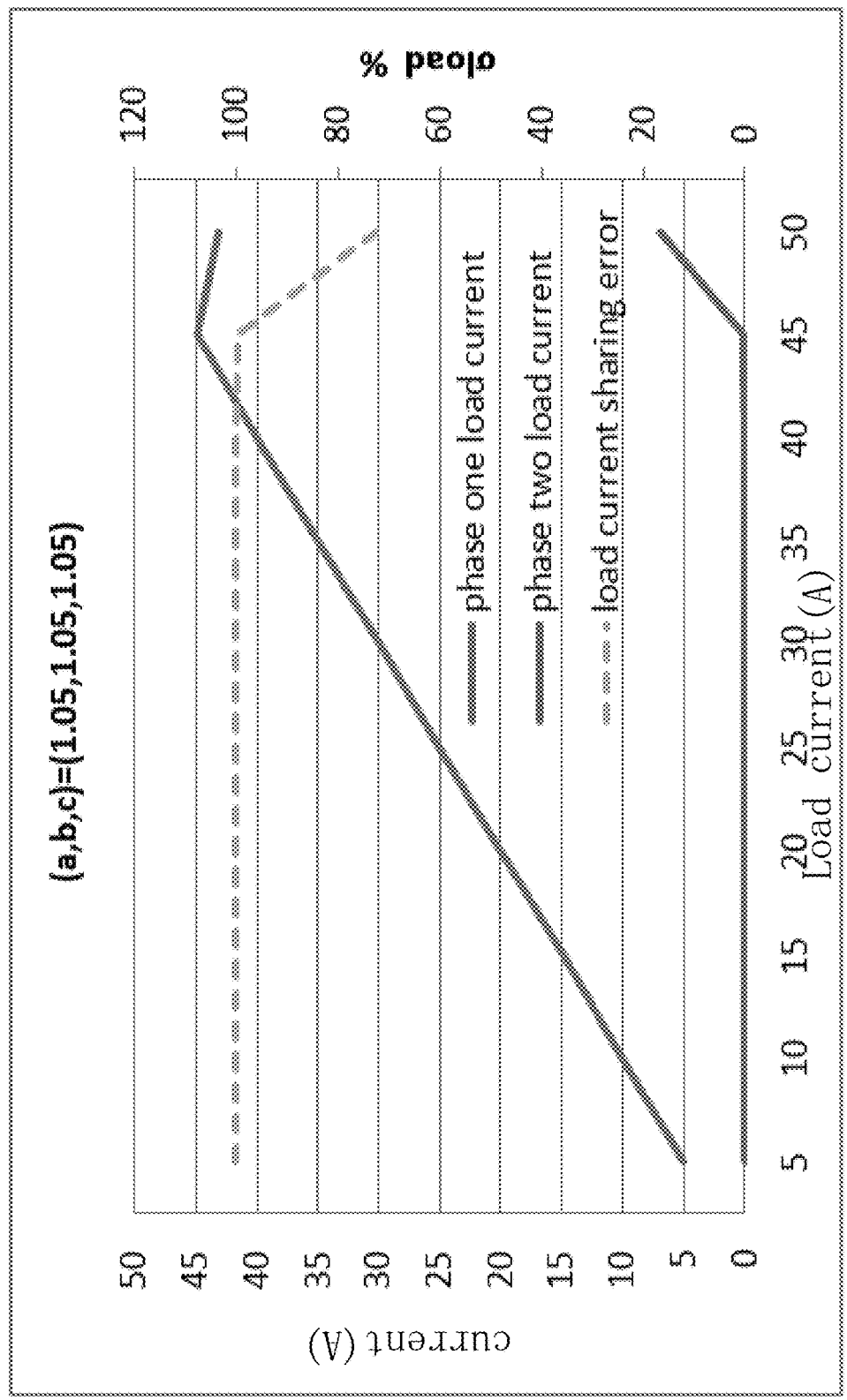

FIGS. 3-6 show load current sharing error $\sigma_{load}$ of the known two-phase LLC resonant converter without current sharing shown in FIG. 30 with 2%, 5%, and 10% differences in component tolerances. If (a, b, c)=(1, 1, 1), then the first and second phases have the same parameters, which results in the load current be perfectly shared and $\sigma_{load}$=0. If (a, b, c)=(1.05, 1.05, 1.05), then the resonant component parameters in phase 2 are 5% more than the resonant component values in phase 1. FIG. 3 shows the load current and the load current sharing error with 2% difference in component tolerances. Only the second phase converter provides load power when the total load current is changed from 5 A to 45 A, the load current sharing error is 100%. FIGS. 4 and 5 show similar results when the component tolerances differences are 5% and 10%. Thus, a two-phase LLC resonant converter without current sharing cannot adequately share the load current. The rated current is 25 A for each phase, which means that the two-phase converter cannot provide the total 50 A power.

Figure 6:
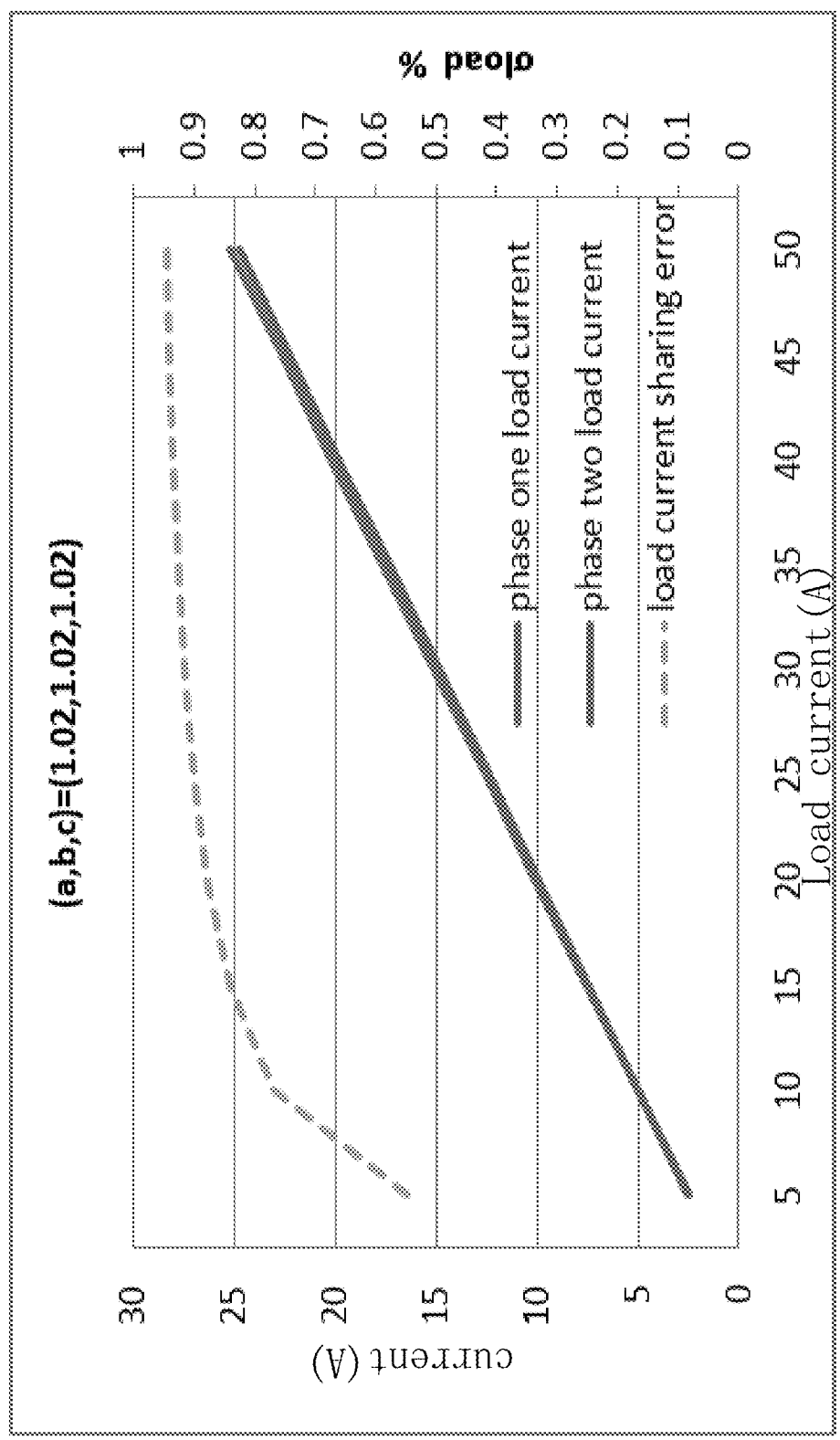
FIGS. 6-8 show load current sharing error for the converter shown in FIG. 1.
Figure 7:
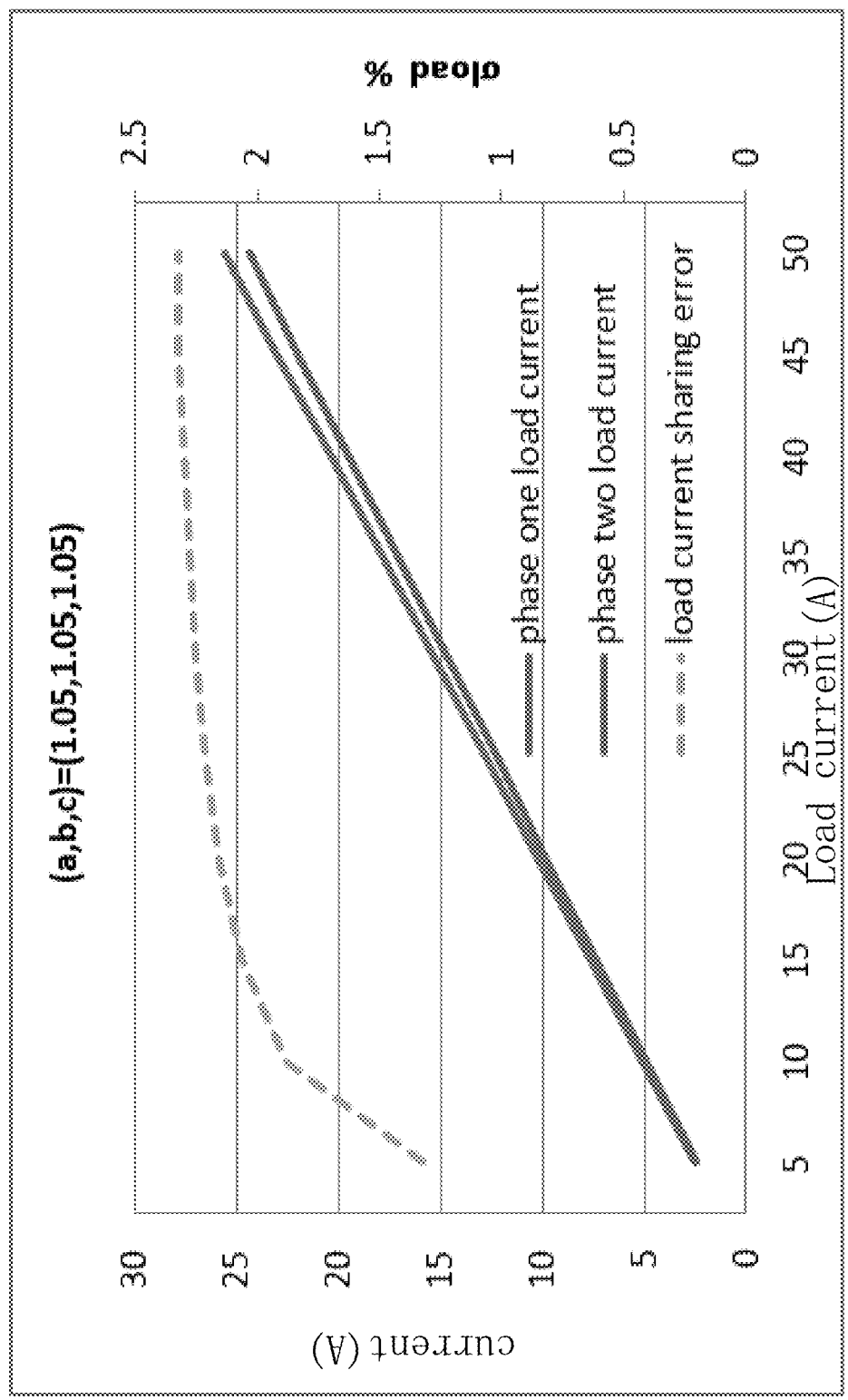
Figure 8:
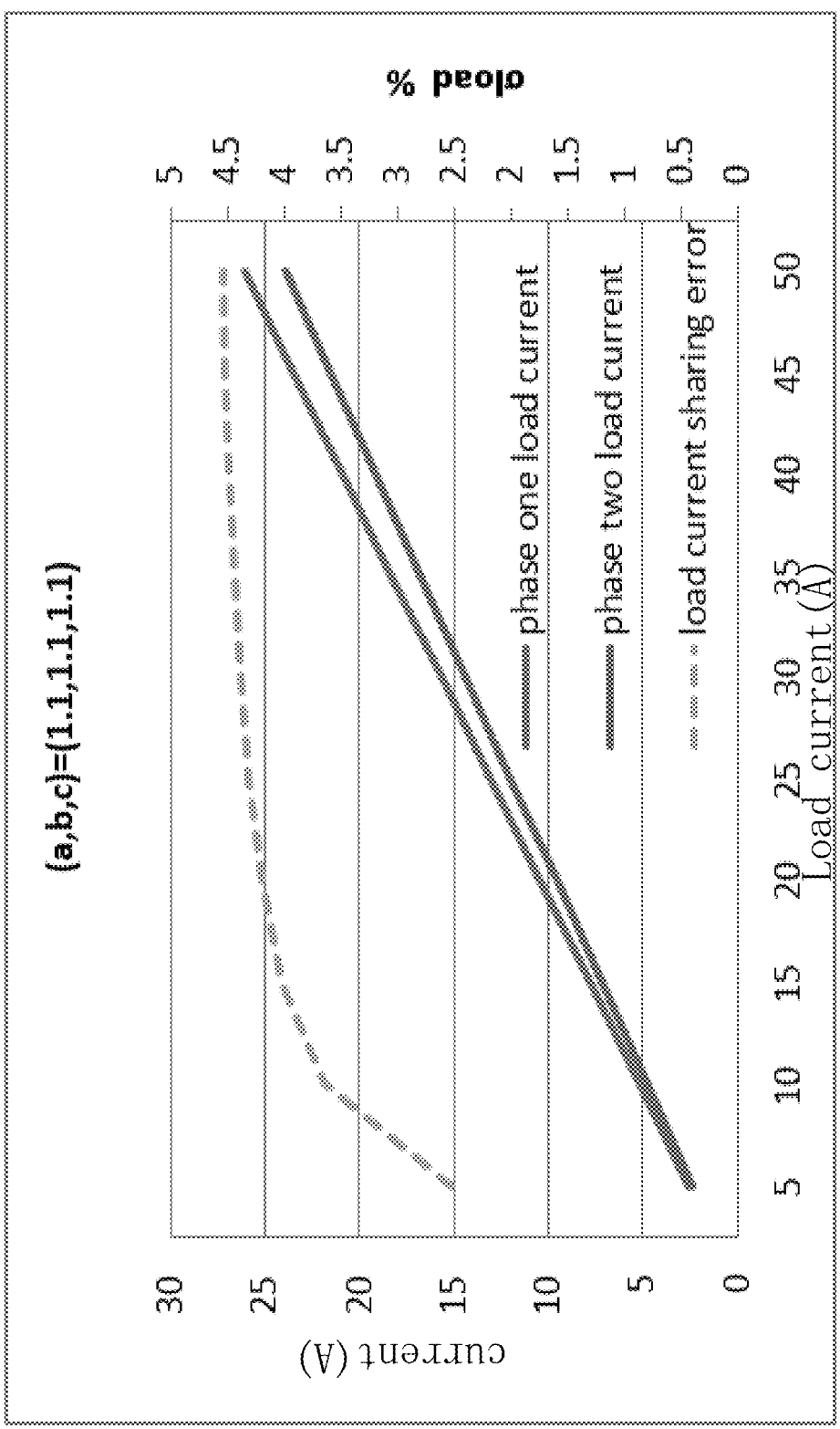

FIGS. 6-8 show load current sharing error $\sigma_{load}$ of a two-phase LLC resonant converter using the common-inductor current-sharing method shown in FIG. 1 with 2%, 5%, and 10% differences in component tolerances. FIG. 6 shows the load current and the load current sharing error with 2% difference in component tolerances. The maximum load current sharing error is 0.95%. The phases share almost the same load current. FIGS. 7 and 8 show similar results when the component tolerances differences are 5% and 10%. The maximum load current sharing error is 2.3% and 4.5%, respectively. The phases share almost the same load current.

A 600 W, two-phase LLC resonant converter prototype was built using the common-inductor current-sharing method to verify the feasibility and to demonstrate the advantages of the common-inductor current-sharing method. The circuit diagram of the prototype is shown in FIG. 1. The parameters of the prototype are shown in Table 2.

TABLE 2

(Prototype parameters)

| | |
|---|---|
| Switching frequency | 180 kHz-270 kHz |
| Input Voltage Vin | 340 V-400 V |
| Output Voltage Vo | 12 V |
| Output Power | 300 W × 2 |
| Transformer Ratio n | 20:1 |
| Output Capacitance Co | 1790 µF |
| Series Capacitance Cr | 12 nF + 5% |
| Resonant Inductance Lr | 22.5 µH (Phase 1) |
| | 24.5 µH (Phase 2) |
| Leakage Inductance Le | 6 µH (Phase 1) |
| | 6.5 µH (Phase 2) |
| Magnetizing Inductance (Lm) | 95 µH (Phase 1) |
| | 92 µH (Phase 2) |

Figure 9:
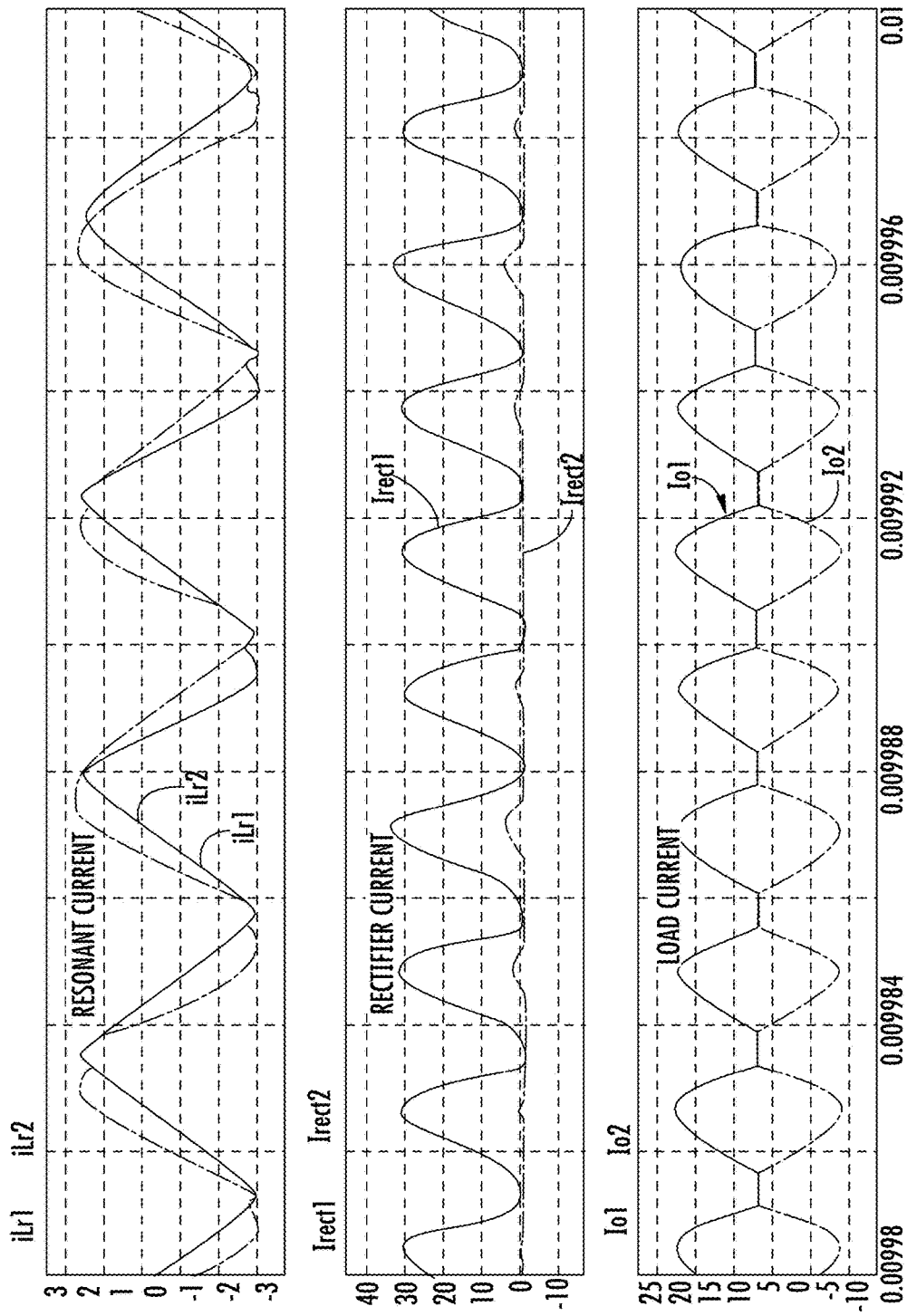
FIGS. 9 and 10 show waveforms of the known converter shown in FIG. 30.
Figure 10:
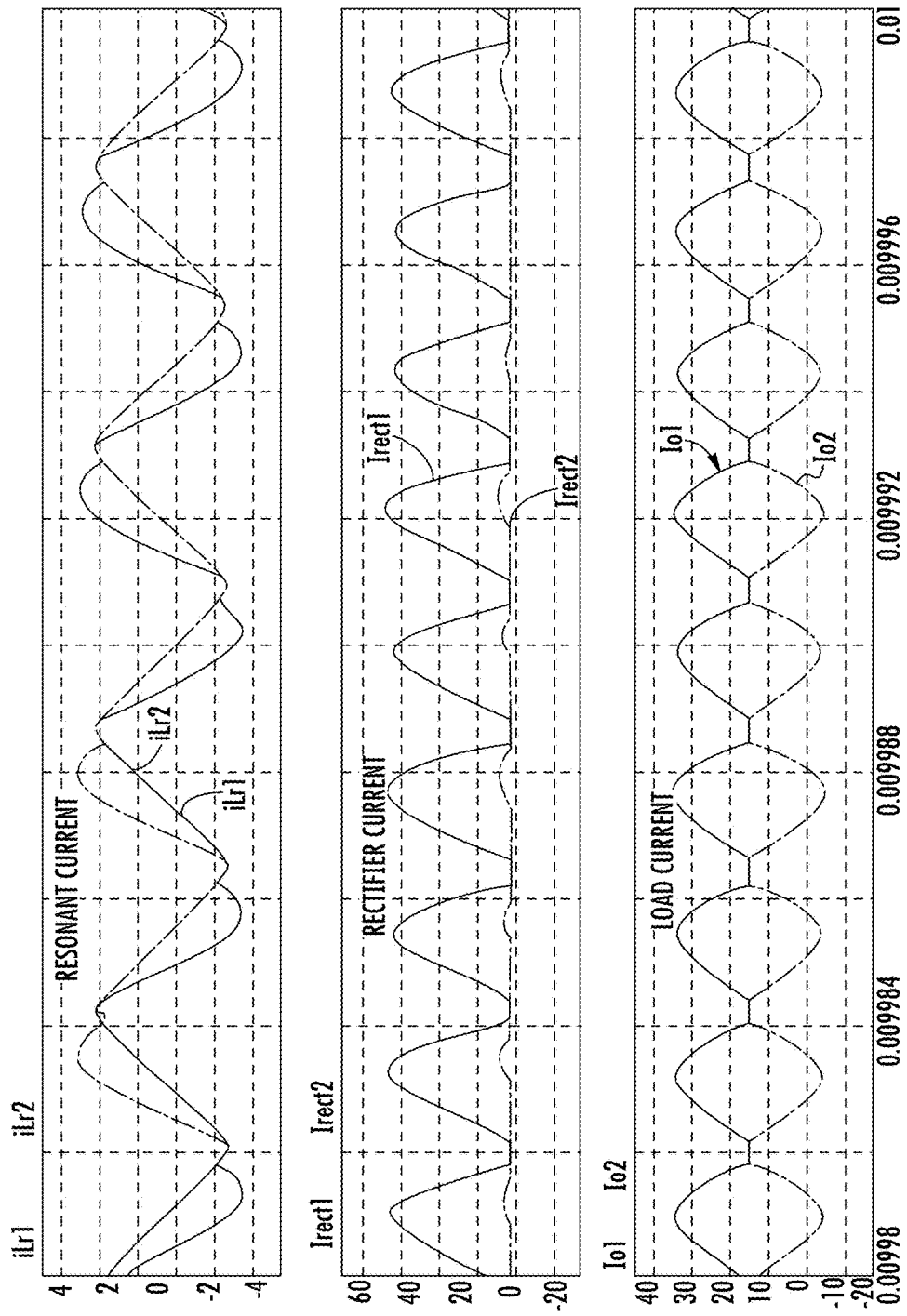

FIGS. 9 and 10 show simulated waveforms at 15 A and 25 A load currents of the known two-phase LLC resonant converter without current sharing in FIG. 30. The rated current for each phase is 25 A, which means that the two-phase converter does not provide the total 50 A load current. When the total load current is larger than 25 A, the second phase load current will exceed the rated current as shown in FIG. 10. To escape the overcurrent of each phase in which the phase current exceeds the rated phase current, the total maximum 25 A current experiment is done without current sharing. Because the output voltage has a switching frequency ripple, the load current Io1 has a high frequency ripple to charge or discharge the output capacitor $C_{o2}$. Thus, the converter has negative high frequency current or positive high frequency current. The average load current is zero. Thus, only phase 1 provides the load power.

Figure 11:
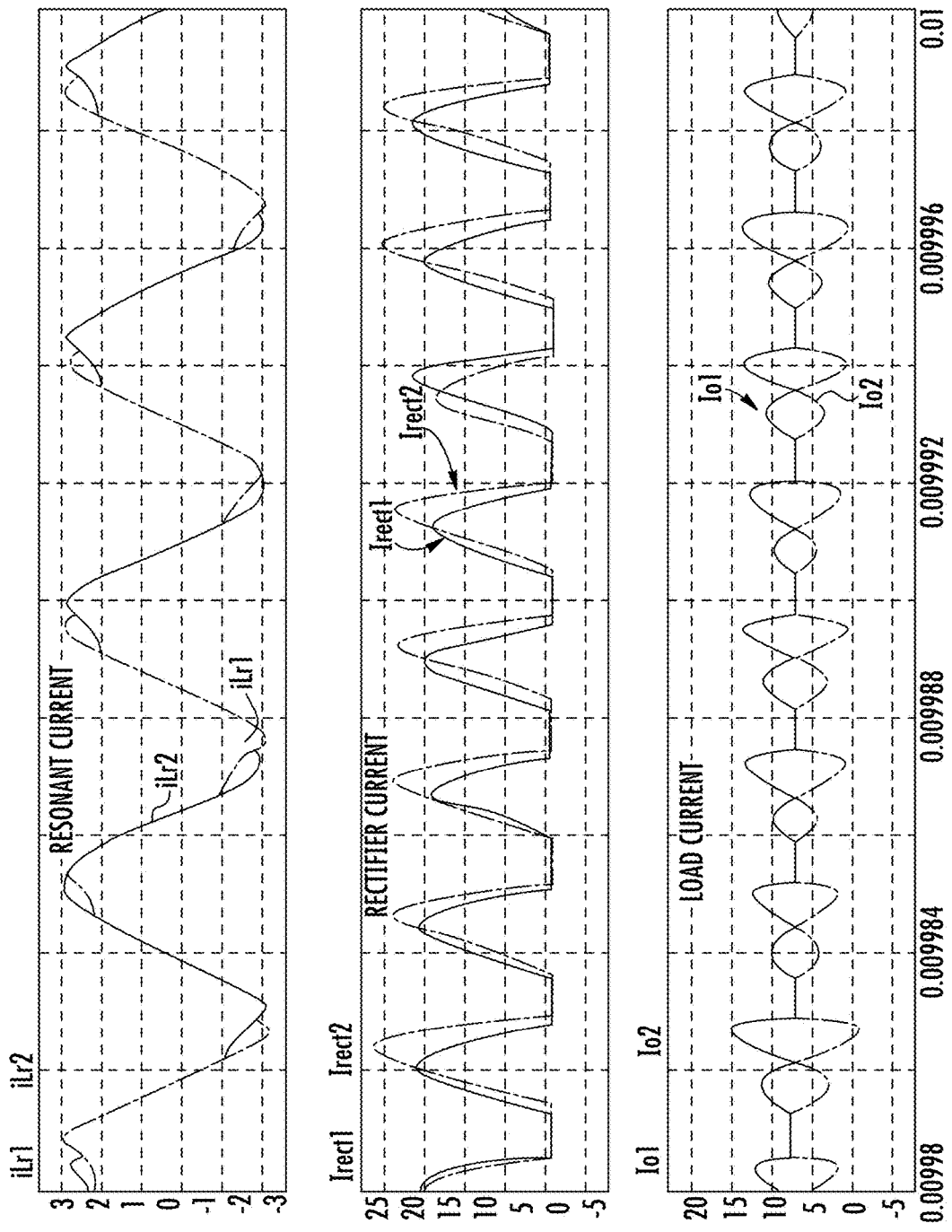
FIGS. 11-13 show waveforms of the converter shown in FIG. 1.
Figure 12:
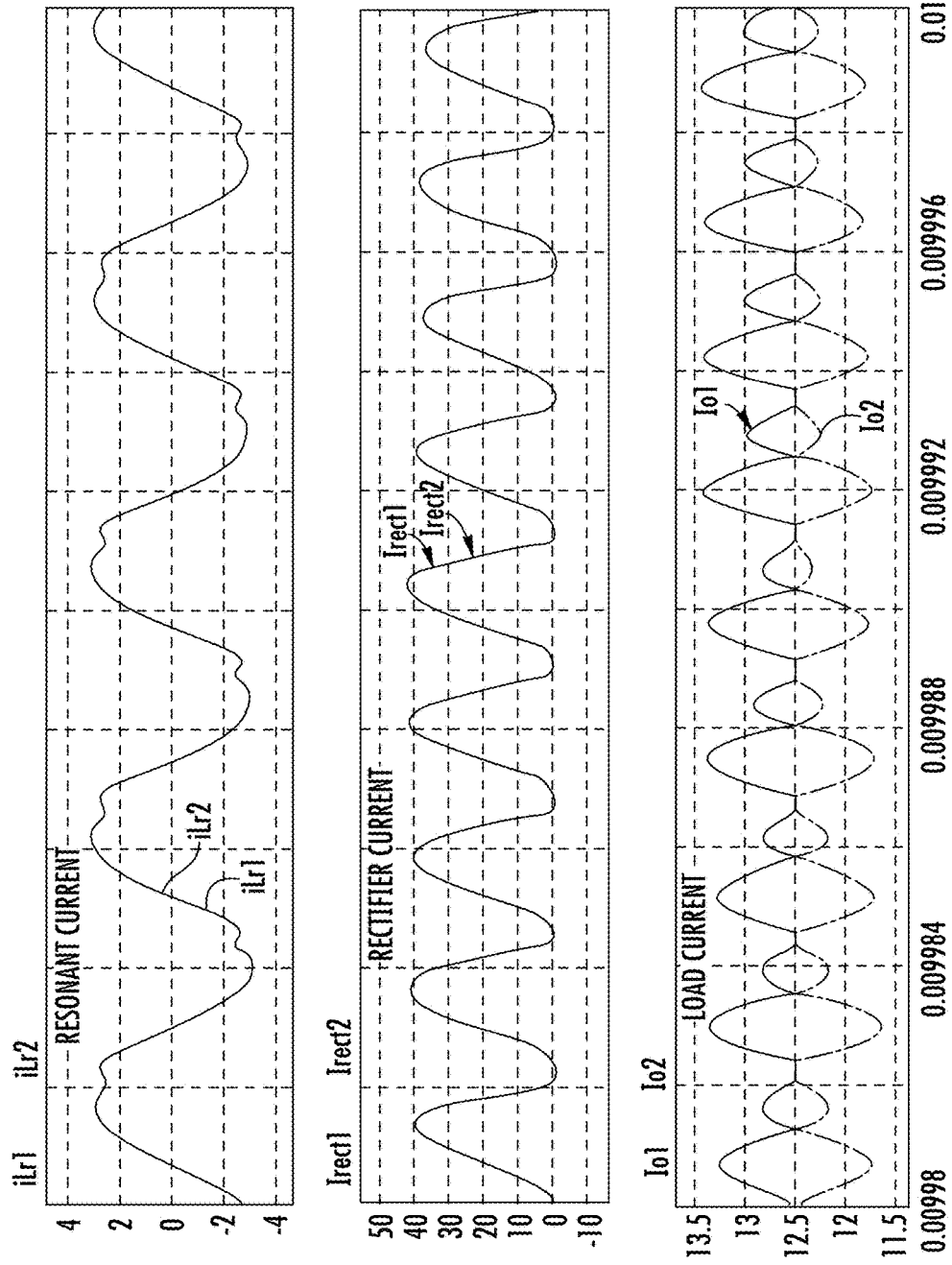
Figure 13:
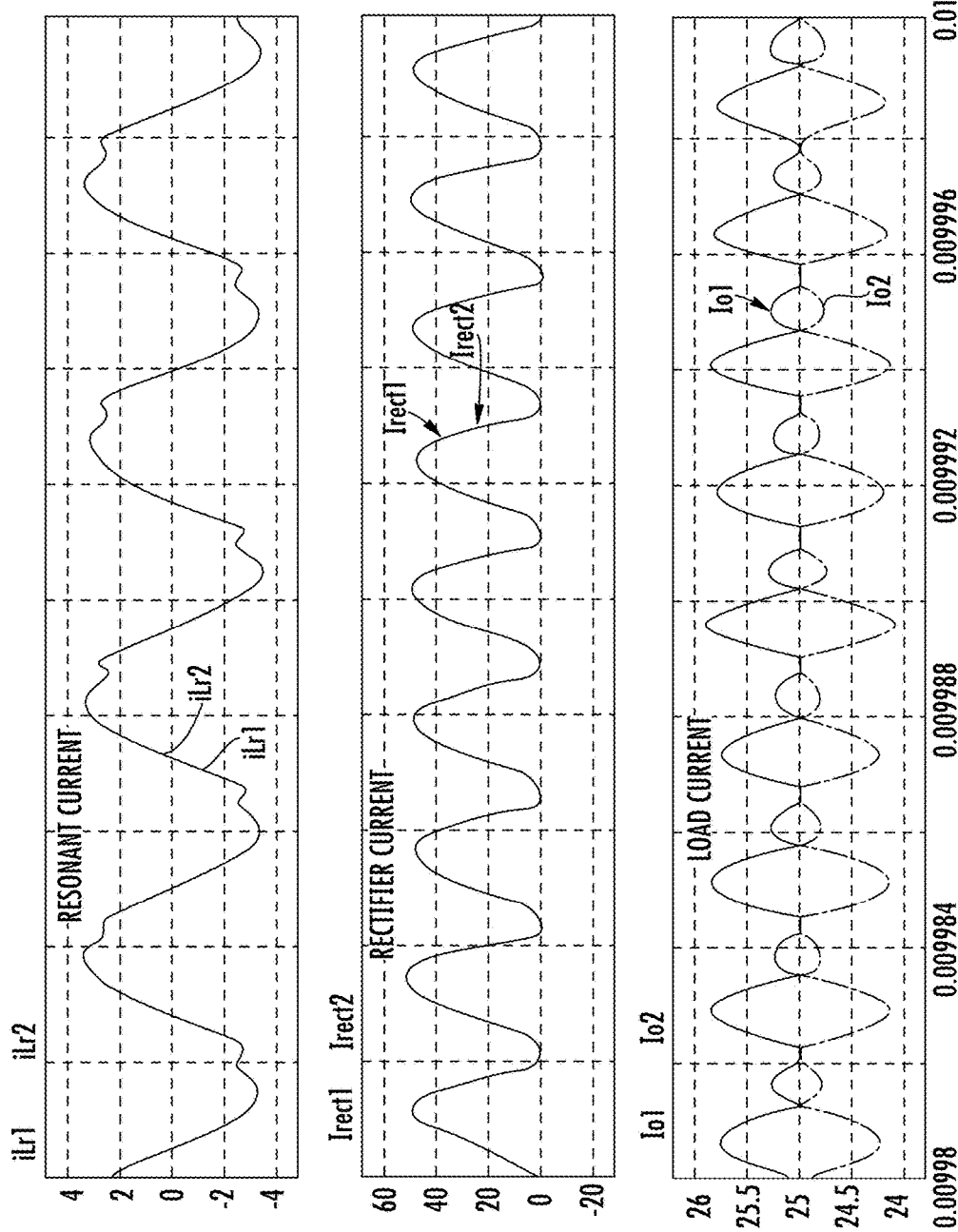

FIGS. 11-13 show simulated waveforms at 15 A, 25 A, and 50 A load currents of the two-phase LLC resonant converter using the common-inductor current-sharing method shown in FIG. 1. The load current difference is reduced from 15 A to 3 A between FIG. 9 and FIG. 11. The load current difference is reduced from 25 A to 0.5 A between FIG. 10 and FIG. 13. FIG. 13 shows the good load sharing for a 50 A load current.

The resonant currents $i_{Lr1}$, $i_{Lr2}$ and the rectifier currents $i_{rect1}$, $i_{rect2}$ are almost the same for the two phases. Thus, the load current is shared by the two phases. Good resonant inductor current sharing guarantees good load current sharing as indicated in FIGS. 9-13.

Figure 14:
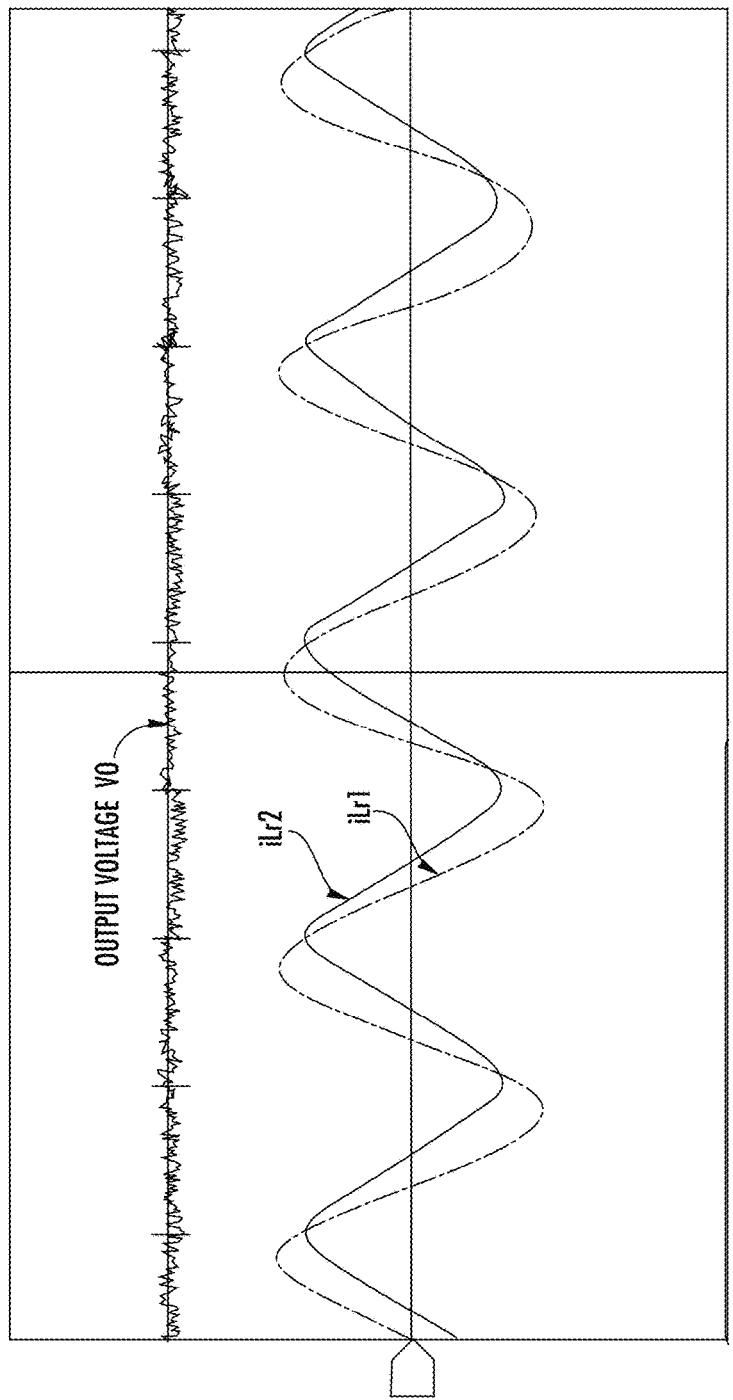
FIGS. 14 and 15 show waveforms of the known converter shown in FIG. 30.
Figure 15:
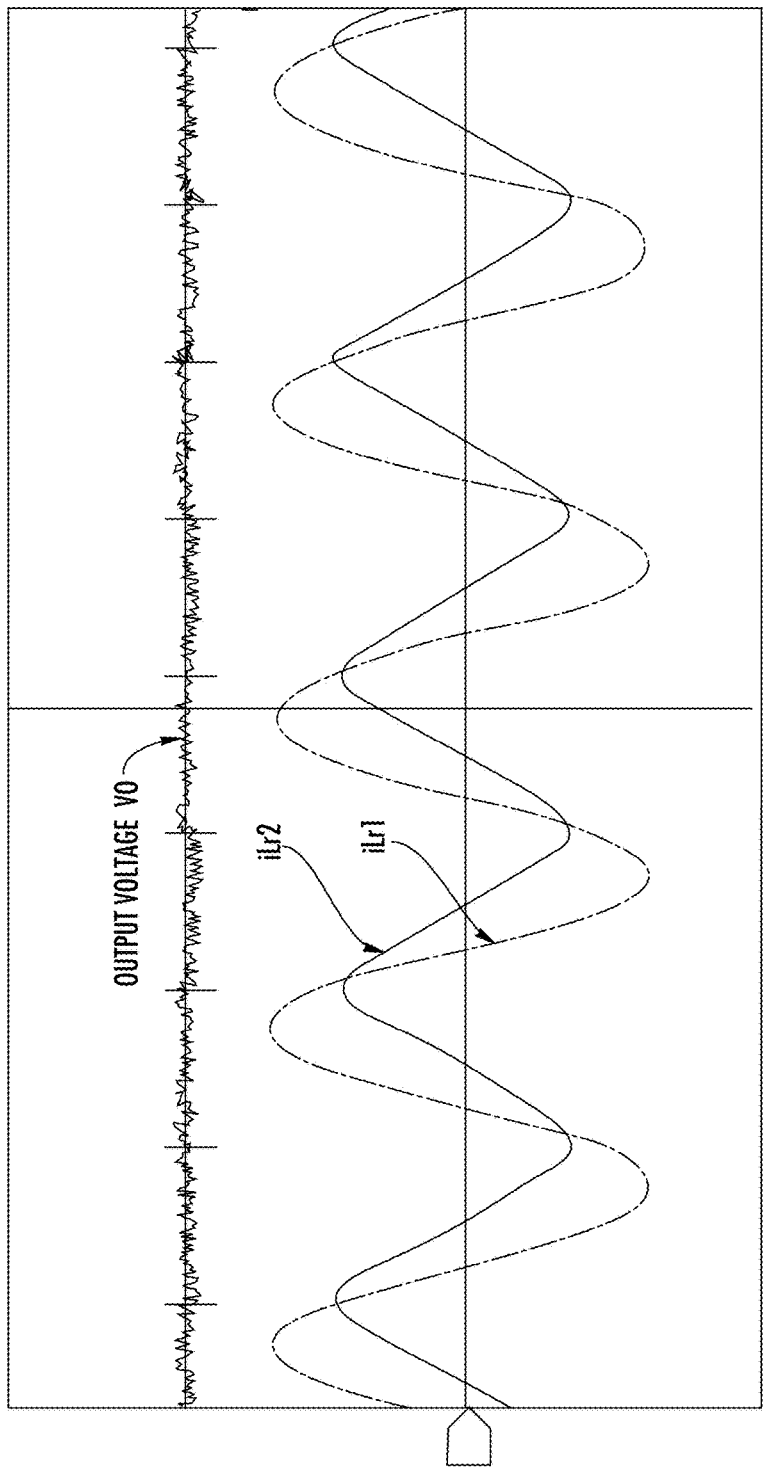
Figure 16:
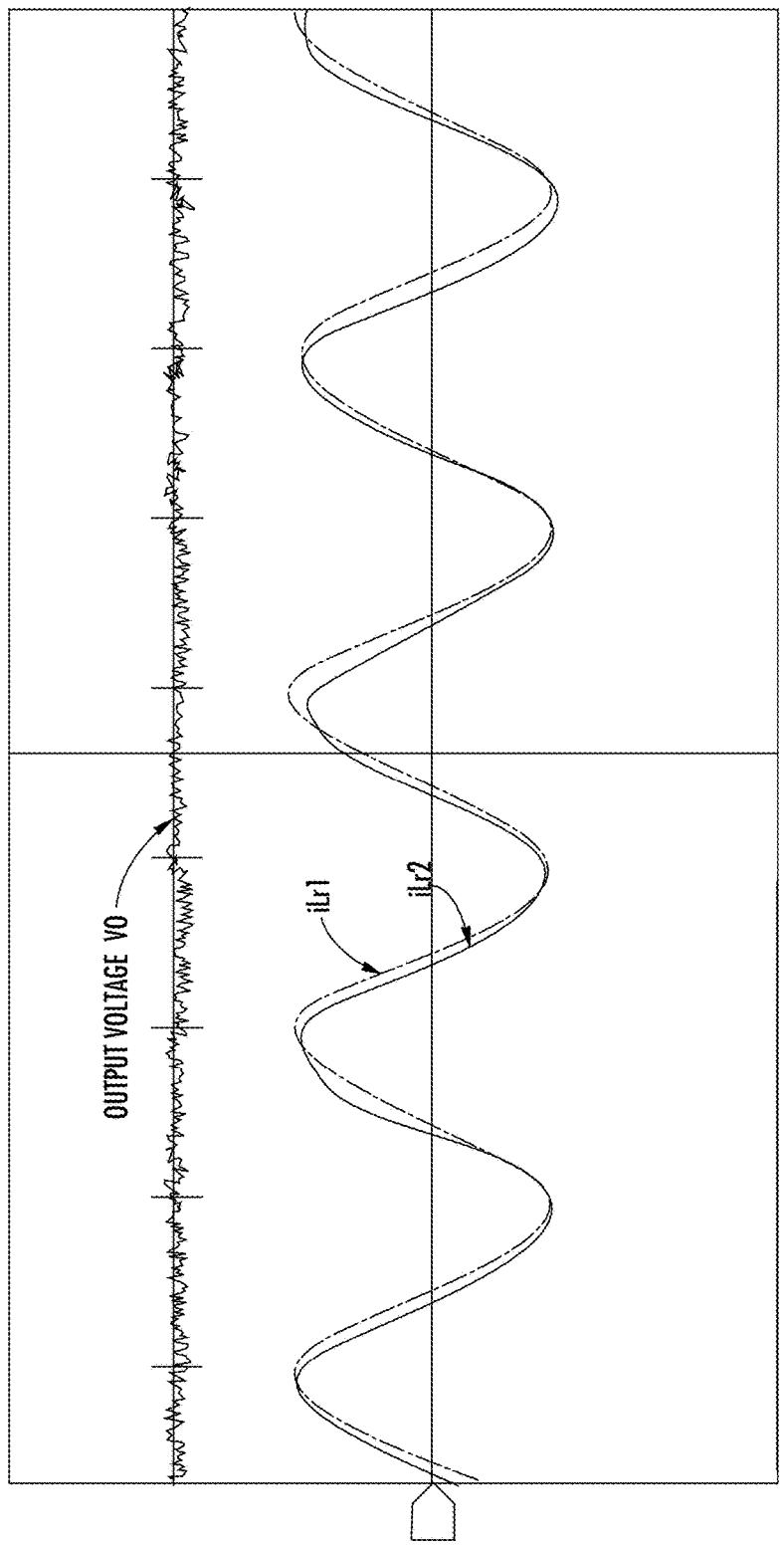
FIGS. 16-18 show waveforms of the converter shown in FIG. 1.
Figure 17:
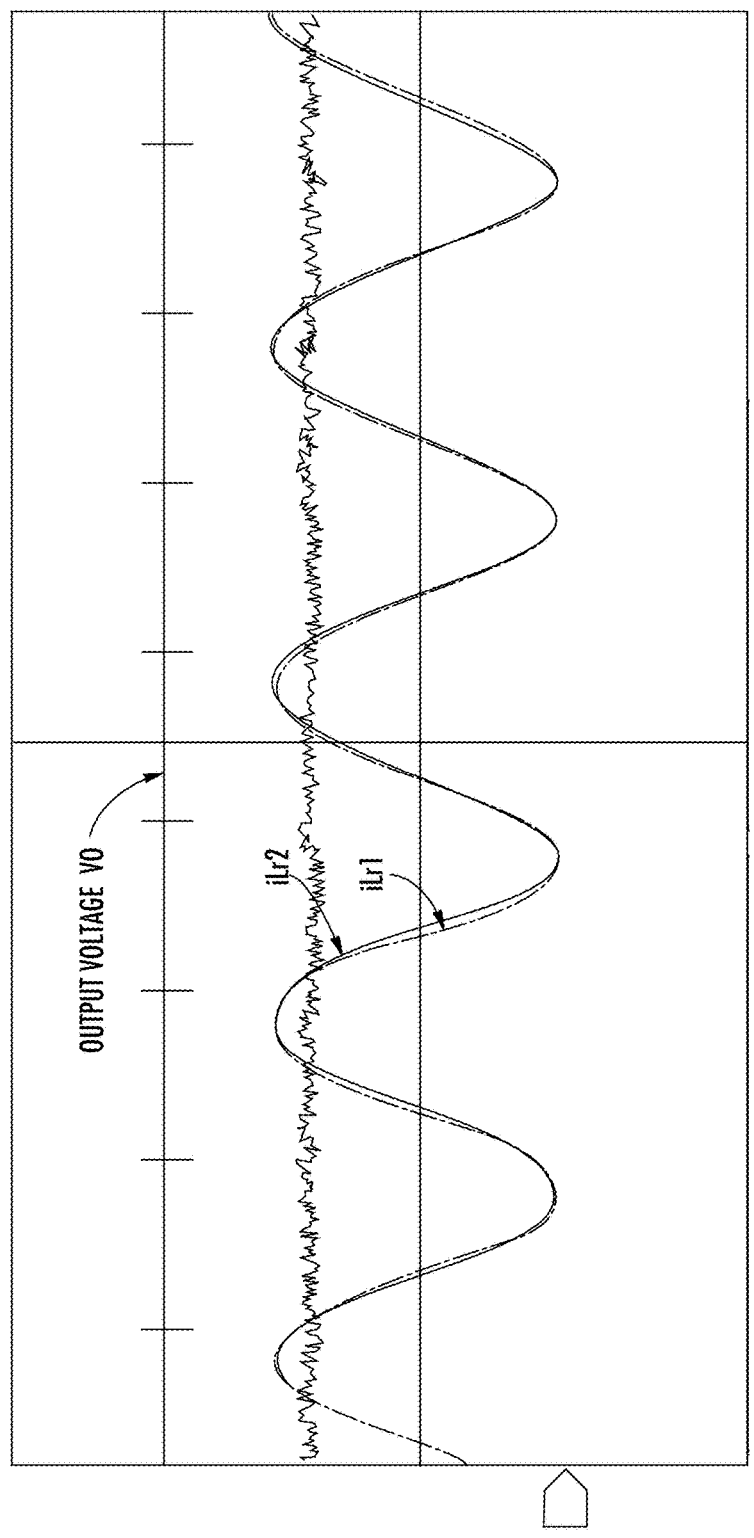
Figure 18:
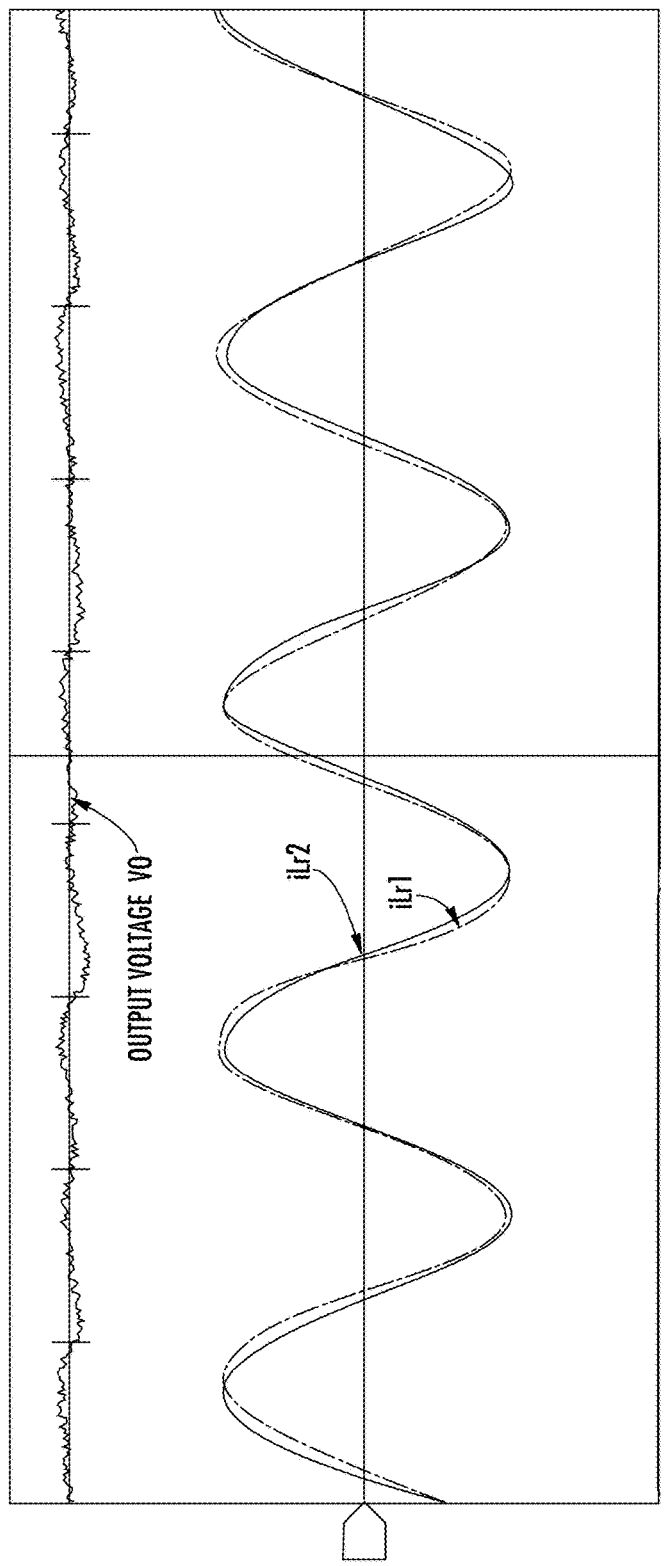

FIGS. 14 and 15 show simulated waveforms at steady-state 180 W and 300 W loads of the known two-phase LLC resonant converter without current sharing in FIG. 30. FIGS. 14 and 15 show the simulated waveforms of the output voltage Vo and the resonant current $i_{Lr1}$, $i_{Lr2}$. The resonant current $i_{Lr1}$ is almost a triangle waveform, which means phase 1 provides very little of the power of the output load. FIGS. 16-18 show simulated waveforms at steady-state 180 W, 300 W, and 600 W loads of the two-phase LLC resonant converter using the common-inductor current-sharing method shown in FIG. 1. The resonant currents $i_{Lr1}$, $i_{Lr2}$ are almost identical. There is a very small angle difference between the resonant currents $i_{Lr1}$, $i_{L2}$ at the different loads.

Figure 19:
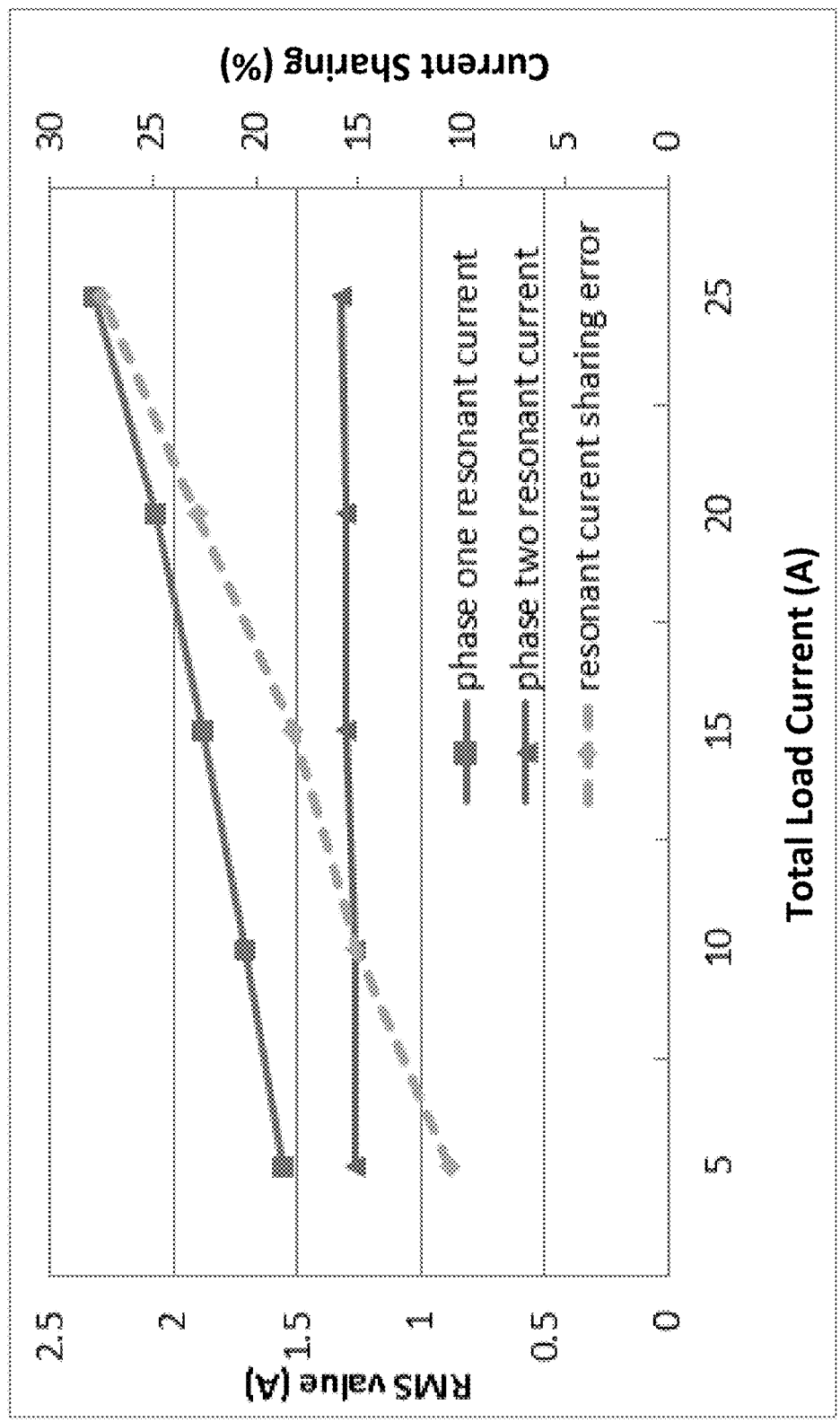
FIG. 19 shows the resonant currents of the known converter shown in FIG. 30.
Figure 20:
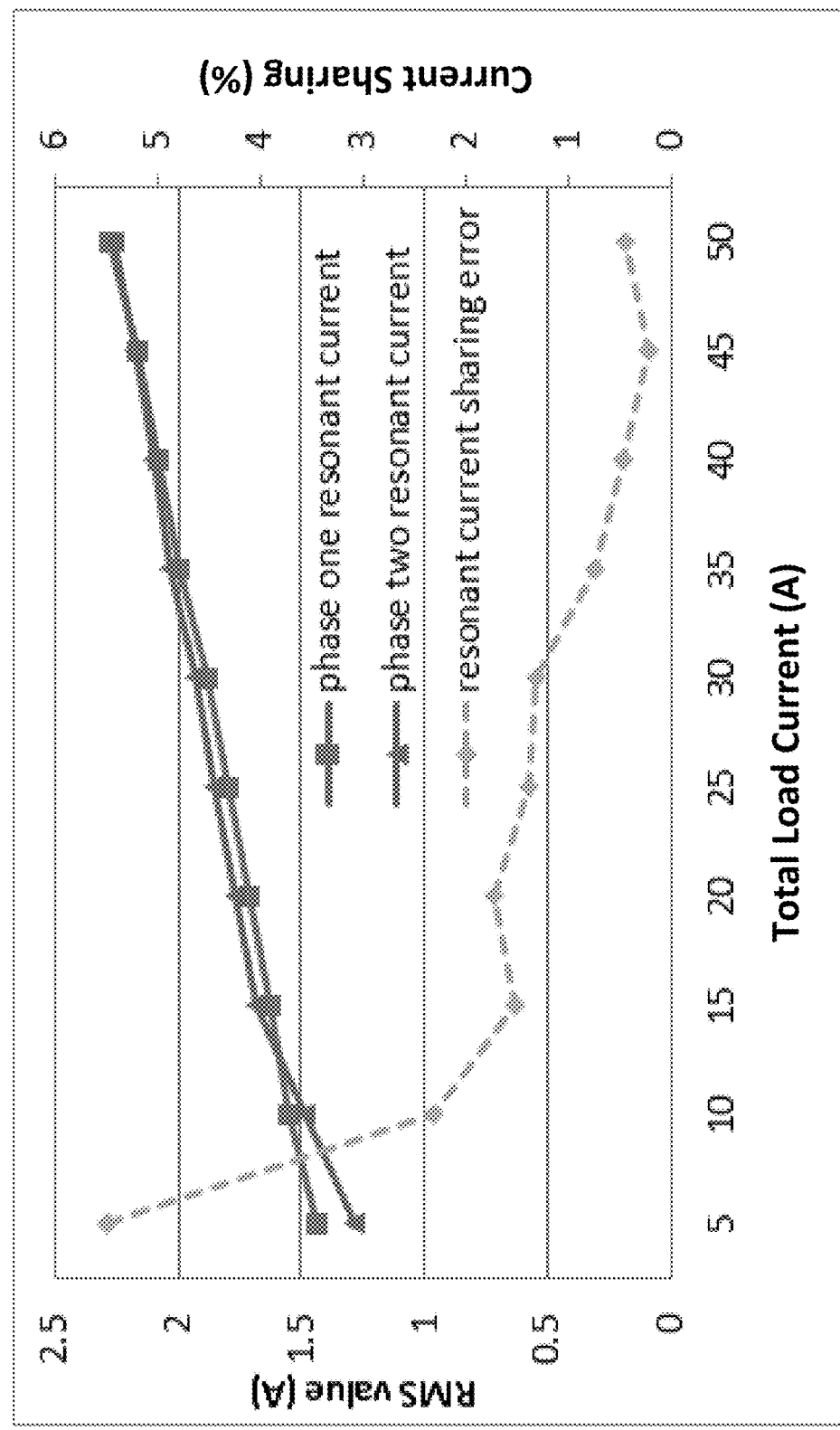
FIG. 20 shows the resonant currents of the converter shown in FIG. 1.

FIG. 19 shows the resonant currents of the known two-phase LLC resonant converter without current sharing in FIG. 30, FIG. 20 shows the resonant currents of the two-phase LLC resonant converter using the common-inductor current-sharing method shown in FIG. 1, and FIG. 32 shows the resonant currents of the two-phase LLC resonant converter using the common-inductor current-sharing method discussed below.

The relative resonant current increases from 10% to 28% as load current increases from 5 A to 25 A in FIG. 19. The relative resonant current decreases from 2.3% to 0.44% as load current changes from 5 A to 50 A in FIG. 20. Thus, the resonant current is significantly reduced using the common-inductor current-sharing method.

Figure 21:
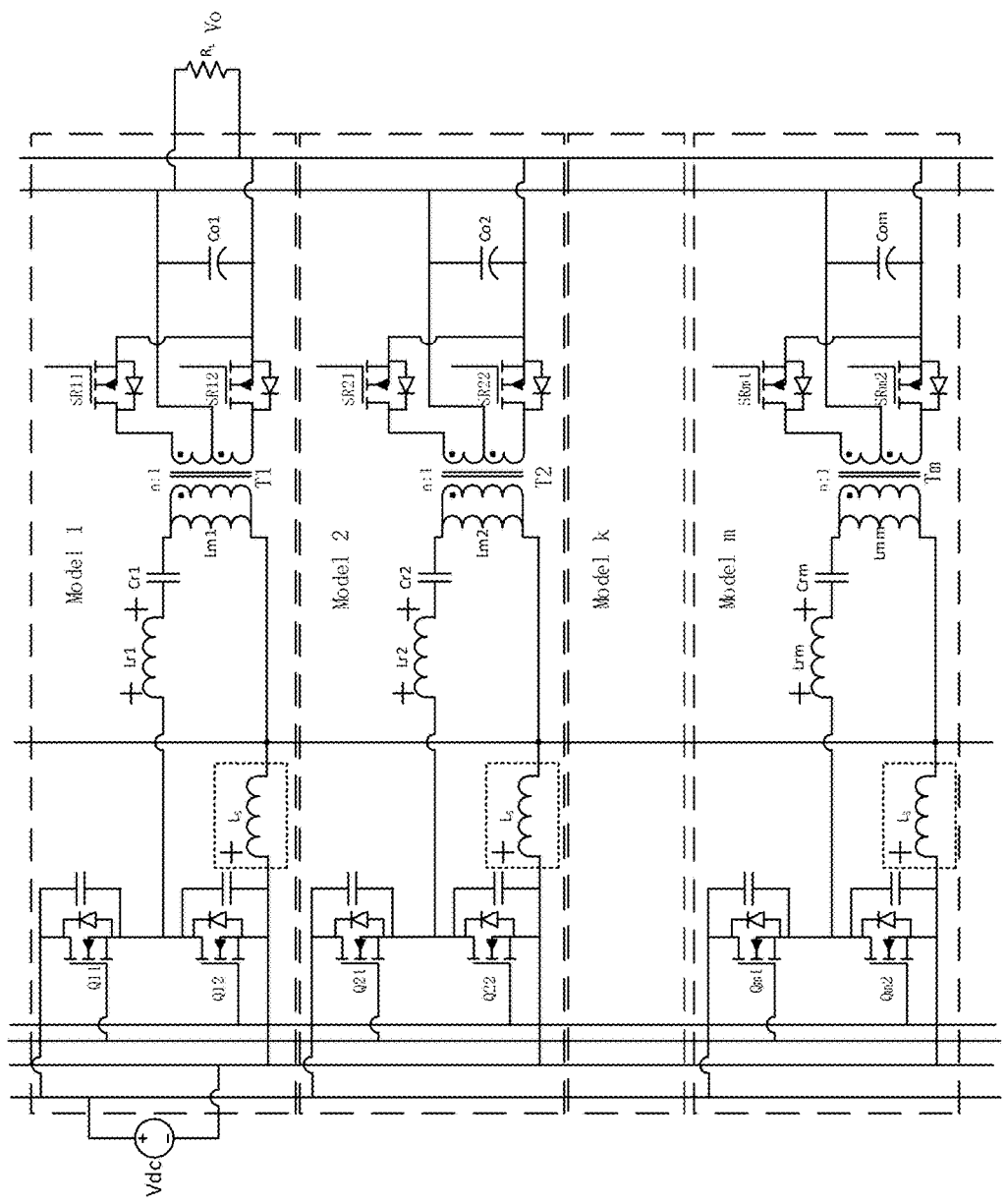
FIG. 21 is a circuit diagram of a modular parallel converter with a shared inductor.

FIG. 21 shows a modular DC/DC converter with m phases connected in parallel. The modular DC/DC converter uses the common-inductor current-sharing method. The modular DC/DC converter includes a DC input that is connected to each of the m phases. For phase k, where k=1 to m, the converter includes two power switches Qk1, Qk2 connected to the DC input; transformer Tk connected to magnetizing inductor Lmk, resonant inductor Lrk, and resonant capacitor Crk; and two synchronous rectifiers SRk1, SRk2 that provide a rectified output to the output capacitor $C_{ok}$. It is possible to use passive diodes instead of active synchronous rectifiers to provide a rectified output. The m phases are connected in parallel to provide an output voltage $V_o$. The load is represented by resistance $R_L$.

Each of the m phases includes an inductor $L_s$ that is connected between the power switch Qk2 and the transformer Tk. The inductors $L_s$ are connected in parallel and are implemented as a single inductor. Each of the inductors $L_s$ includes a left node and a right node. All of the left nodes of the inductors $L_s$ are connected to the ground of DC input, and all of the right nodes of the inductors $L_s$ are connected together. Because the inductors $L_s$ are connected together, they define an equivalent inductance with a common branch through which the current of the phases flow. A sharing line is connected to the right node between the inductor $L_s$ and the transformer Tk in each phase. The inductors $L_s$ of each phase are connected in parallel with each other. The inductors $L_s$ are charged and discharged by the resonant current in each phase because they are connected by the common branch. When the resonant currents are different between the phases, the inductors $L_s$ build up a connection of each phase through the voltages of the inductors $L_s$, eliminating the circulated current and sharing the load.

Figure 22:
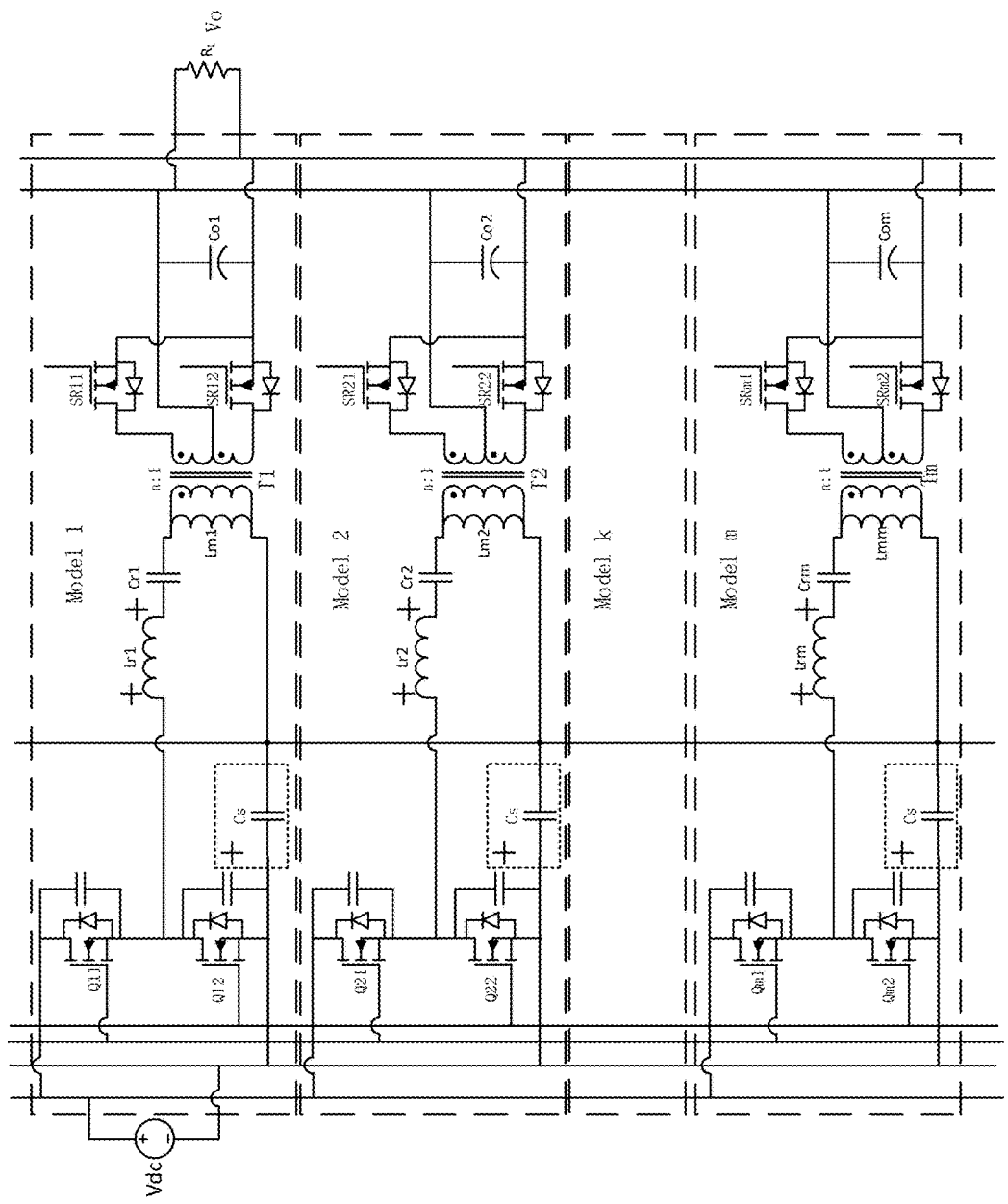
FIG. 22 is a circuit diagram of a modular parallel converter with a shared capacitor.

FIG. 22 is similar to FIG. 21 expect that the m phases share the capacitor $C_s$ instead of inductor $L_S$. The converter in FIG. 22 uses a common-capacitor current-sharing method according to a comparative example. The capacitors $C_s$ of each phase are connected in parallel with each other. The capacitors $C_s$ are charged and discharged by the resonant current in each phase because they are connected by the common branch. When the resonant currents are different between the phases, the capacitors $C_s$ builds up the connection of each phase through the voltage of capacitors $C_s$, eliminating the circulated current and sharing the load. In FIG. 22, only an additional resonant capacitor Crk is used. The value of the resonant capacitor Crk can be small compared to the value of the known series DC capacitor discussed above. In addition, in FIG. 22, the value of the total resonant capacitor can be divided into two parts: (a) two capacitors connected in series and (b) one capacitor connected in parallel. Thus, only a portion of the resonant capacitor Crk is connected in parallel as a common capacitor. In FIG. 22, if the right node of capacitors $C_s$ are not connected, then the total capacitance of each phase is the capacitance of the capacitor $C_s$ plus the capacitance of the resonant capacitor Crk. Thus, the capacitance can be divided into two parts. If the right nodes of the capacitors Cs are connected together, then all capacitors Cs are connected in parallel because of their left nodes are also connected together. FIGS. 20 and 32 show that the common-inductor current-sharing method can achieve a resonant current error of only 0.44% at 600 W total load power, while the common-capacitor current-sharing method is only able to achieve a resonant current error of 5% at 600 W total load power.

In FIGS. 21 and 22, all of the inductance or capacitance is connected in parallel, which means one inductor $L_s$ or one capacitor $C_s$ can be used. It is also possible to divide the inductance or the capacitance so that two inductors or two capacitors are used. The best performance can be achieved when all of inductance or capacitance are connected in parallel. Each of the inductors $L_s$ preferably have the same value, and each of the capacitors $C_s$ preferably have the same value. However, because of the component tolerances in the different phases, the inductors $L_s$ and the capacitors $C_s$ can have different values.

Figure 23:
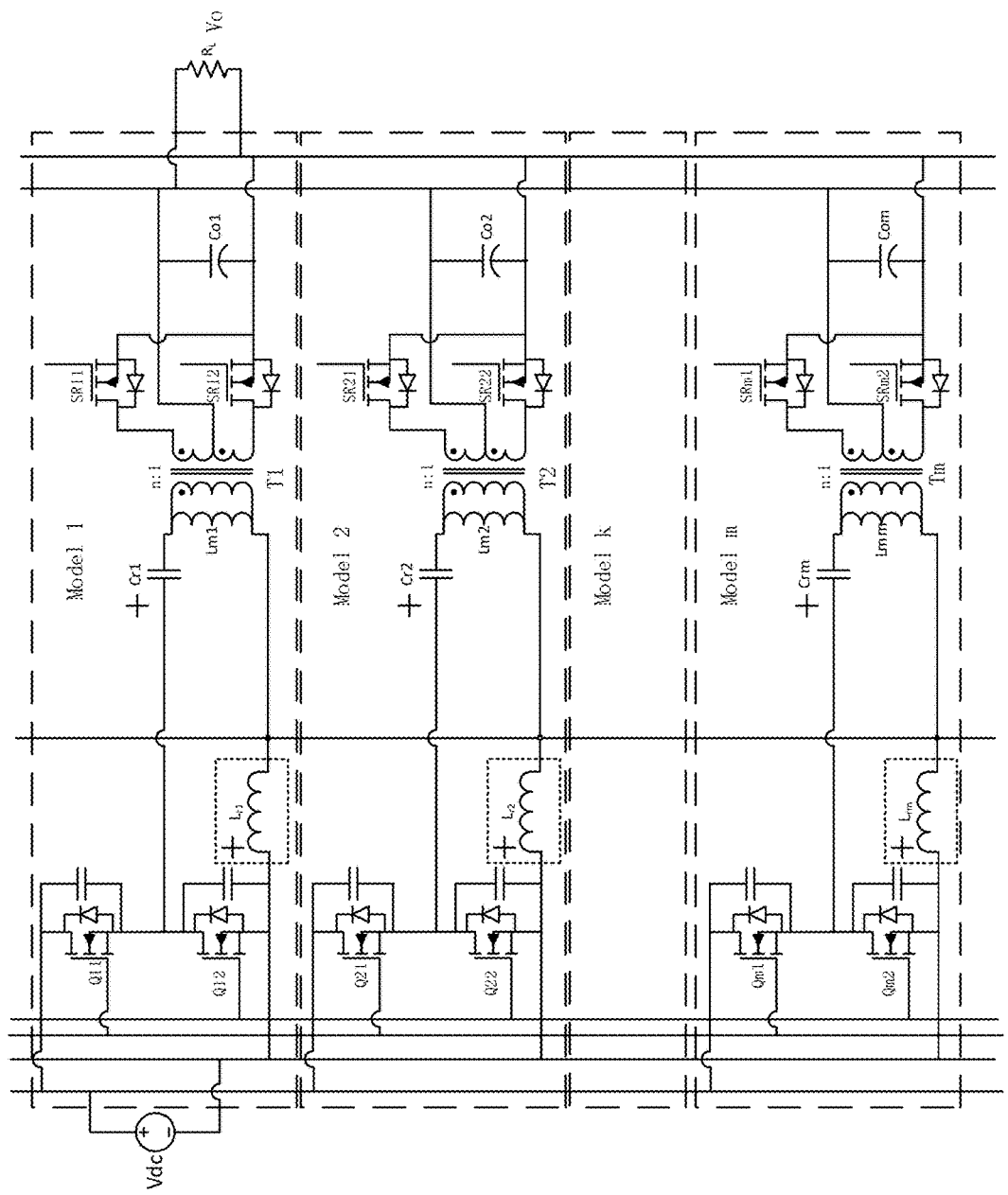
FIG. 23 is a circuit diagram of a specific example of FIG. 21.
Figure 24:
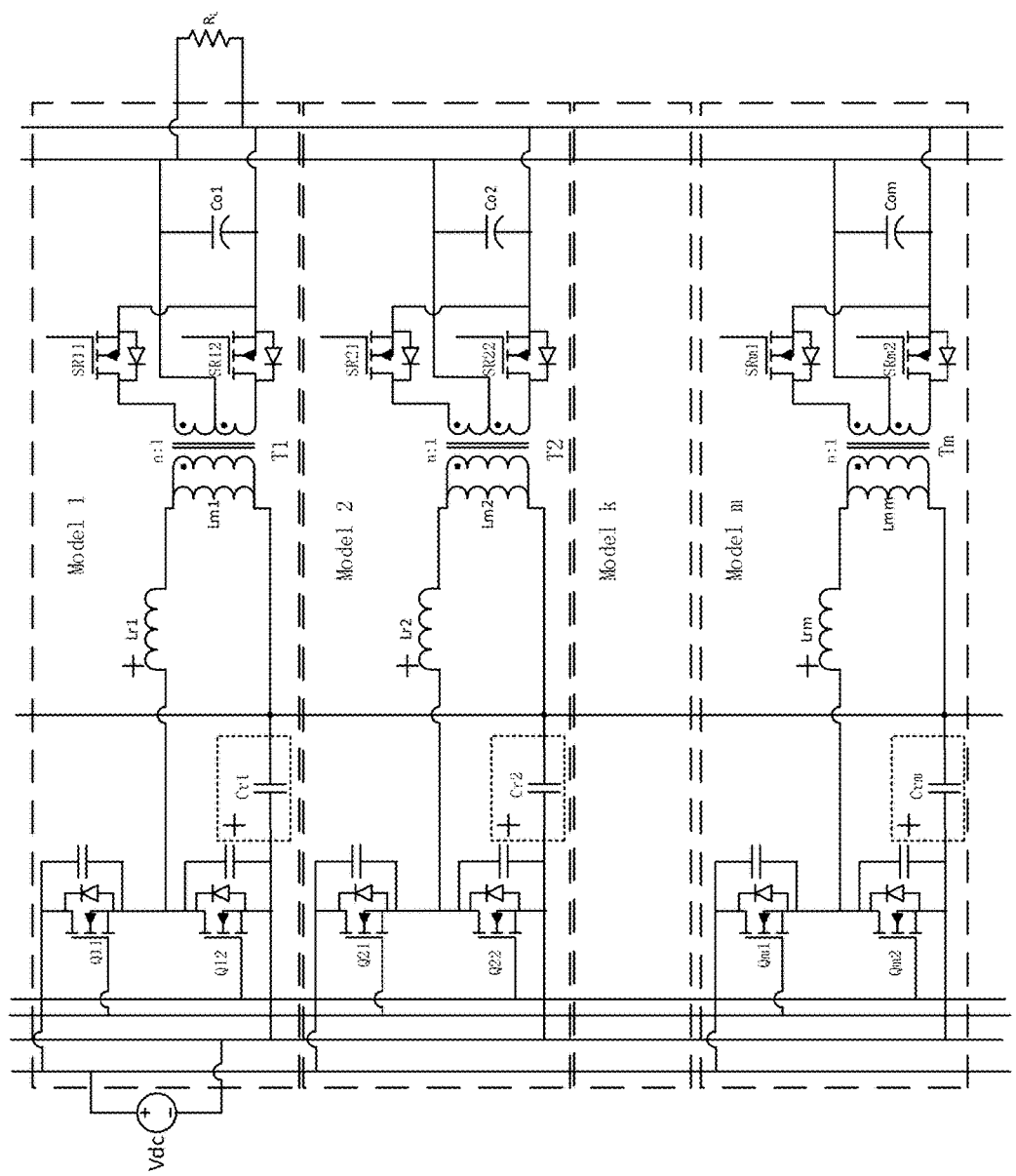
FIG. 24 is a circuit diagram of a specific example of FIG. 22.

FIG. 23 is a specific example of FIG. 21 in which the shared inductor $L_s$ is the resonant inductor Lrk, and FIG. 24 is a specific example of FIG. 22 in which the shared capacitor $C_s$ is the resonant capacitor Crk. The total inductor value is the same in FIGS. 21 and 23, and the total capacitor value is the same in FIGS. 22 and 24. In FIG. 21, a portion of the value of the resonant inductor Lrk is included in the common branch to share the phases, and in FIG. 23, the total value of the resonant inductor Lrk is included in the common branch to share the phases. In FIG. 22, a portion of the value of the resonant capacitor Crk is included in the common branch to share the phases, and in FIG. 24, the total value of the resonant capacitor Crk is included in the common branch to share the phases.

Figure 25:
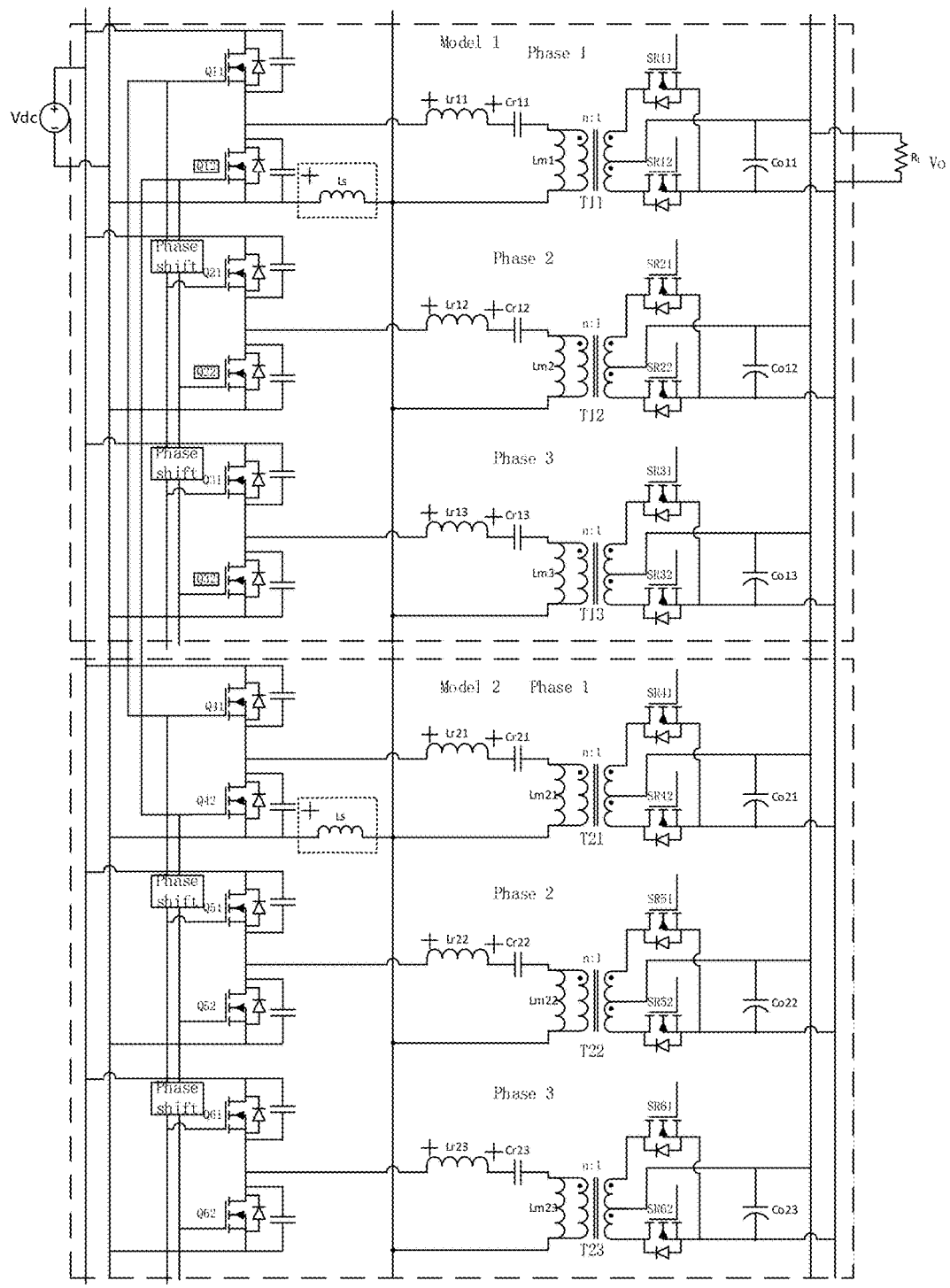
FIG. 25 shows two modular parallel three-phase converters with a shared inductor.

FIG. 25 shows two three-phase modules connected in parallel and using the common-inductor current-sharing method. Each module has three phases, and the resonant inductor $L_s$ is shared between the modules with phase shift modulation. The two modules are connected by the shared inductor $L_s$. The two inductors $L_s$ are connected in parallel and are implemented as one combined inductor. Two inductors $L_s$ are combined and shared between the two converters.

Figure 26:
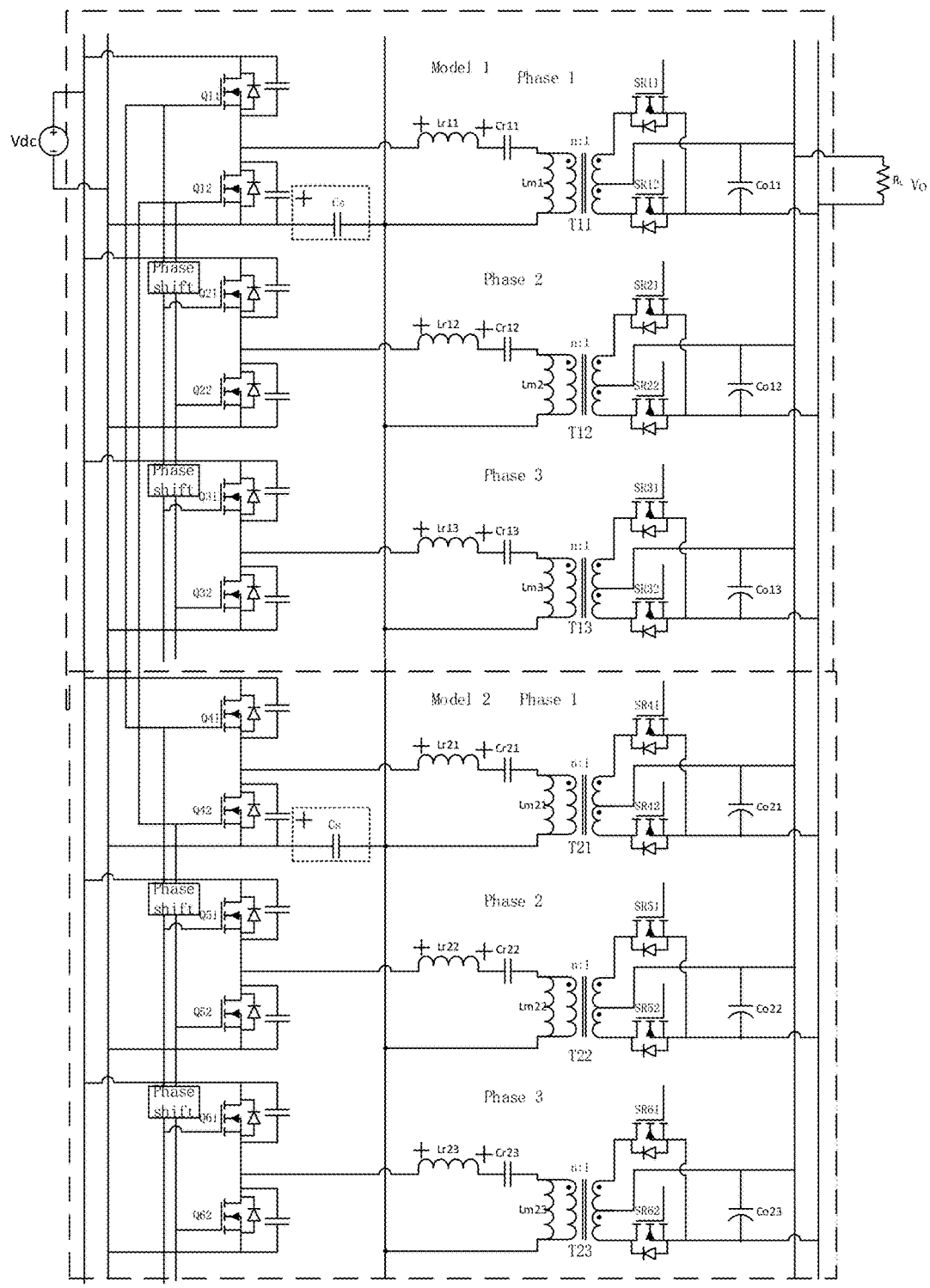
FIG. 26 shows two modular parallel three-phase converters with a shared capacitor.
Figure 27:
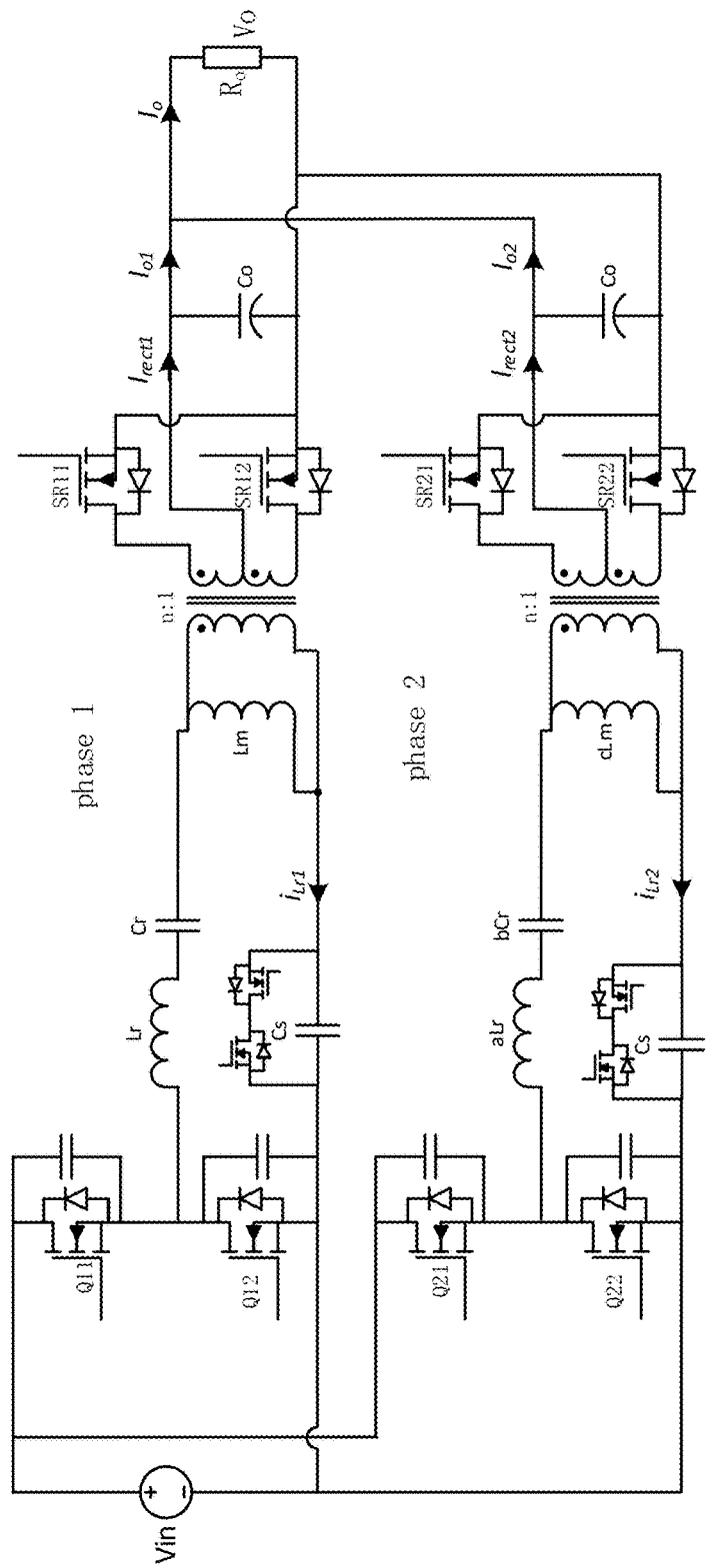
FIG. 27-29 show converters using known current-sharing methods.
Figure 28:
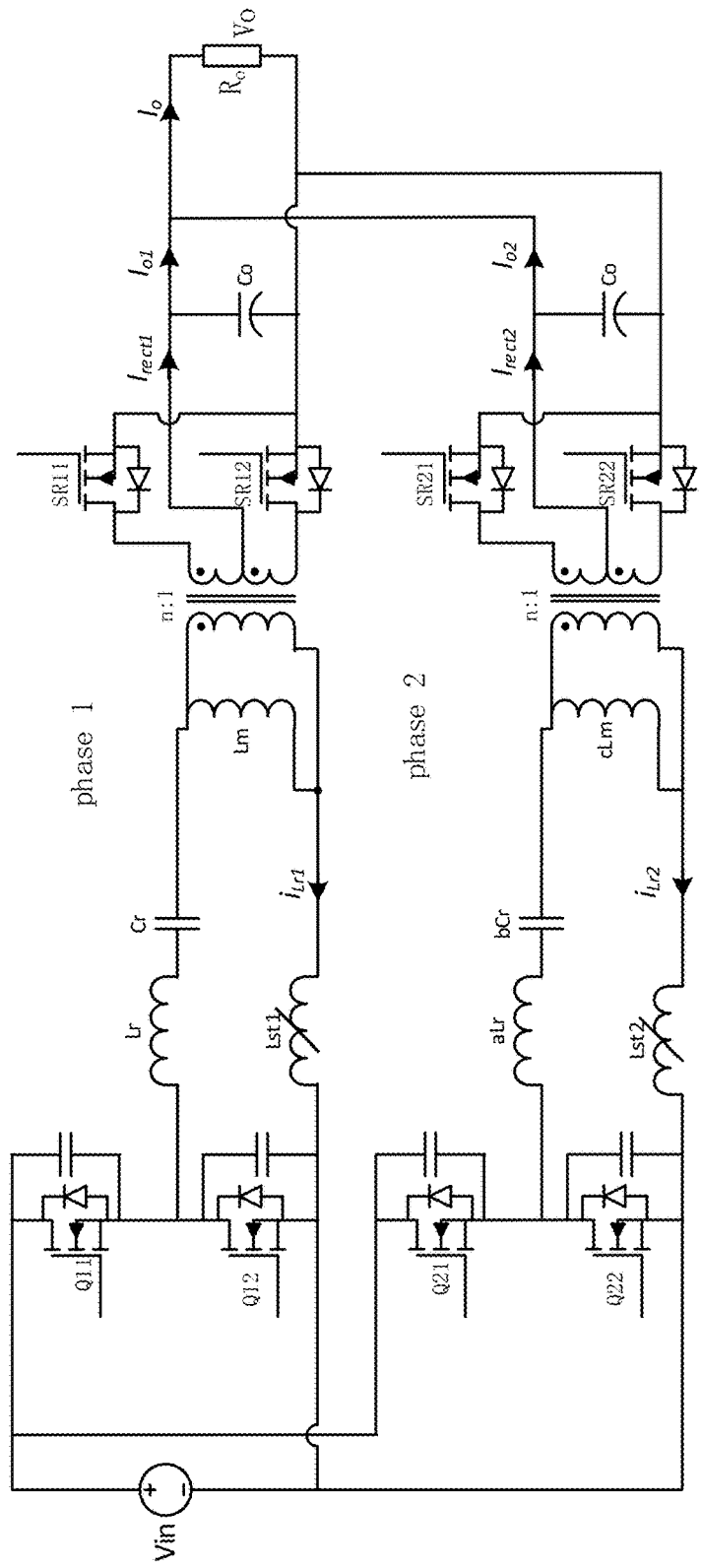
Figure 29:
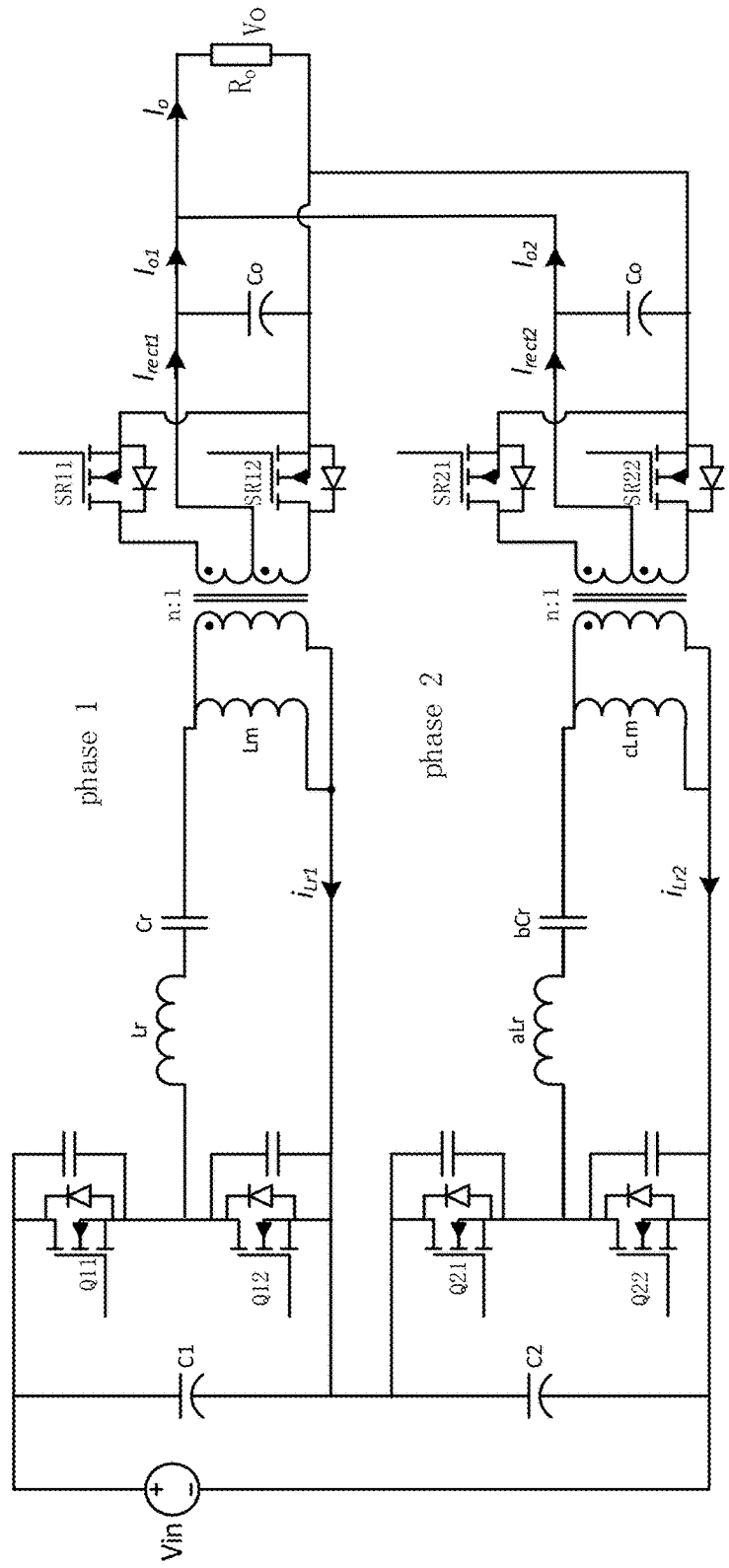

FIG. 26 is similar to FIG. 25 except that capacitor $C_s$ is shared instead of inductor $L_s$. The two three-phase modules in FIG. 26 use the common-capacitor current-sharing method. In FIG. 26, the resonant capacitor $C_s$ is shared between the modules with phase shift modulation. The two modules are connected by the shared capacitor $C_s$. The capacitors $C_s$ are connected parallel with each other. The capacitor $C_s$ is included in the common branch, which can influence the distribution of the resonant current through the voltage of the common capacitor $C_s$.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An LLC resonant converter comprising:
   a voltage input;
   a voltage output;
   a first phase including:
     a first transformer with first primary and first secondary windings;
     a first primary circuit connected to the voltage input and the first primary winding, the first primary circuit including:
       a first resonant capacitor;
       a first magnetizing inductor connected in parallel across the first primary winding; and
       a first resonant inductor; wherein
       the first resonant capacitor, the first magnetizing inductor, and the first resonant inductor are connected in series;
     a first secondary circuit connected to the first secondary winding and the voltage output, the first secondary circuit including a first rectifying circuit; and
   a second phase including:
     a second transformer with second primary and second secondary windings;
     a second primary circuit connected to the voltage input and the second primary winding, the second primary circuit including:
       a second resonant capacitor;
       a second magnetizing inductor connected in parallel across the second primary winding; and
       a second resonant inductor; wherein
       the second resonant capacitor, the second magnetizing inductor, and the second resonant inductor are connected in series;
     a second secondary circuit connected to the second secondary winding and the voltage output, the second secondary circuit including a second rectifying circuit; wherein
   the first primary circuit includes a first shared inductor with first and second ends;
   the second primary circuit includes a second shared inductor with first and second ends;
   the first and second shared inductors are connected in parallel with each other such that the first ends of the first and second shared inductors are directly connected to each other, and the second ends of the first and second shared inductors are directly connected to each other; and
   the first and second primary circuits do not include a capacitor that is connected in parallel with each other.

2. The LLC resonant converter of claim 1, wherein the first and second rectifying circuits include synchronous rectifiers.

3. The LLC resonant converter of claim 1, wherein the first phase includes a first output capacitor, and the second phase includes a second output capacitor.

4. The LLC resonant converter of claim 1, further comprising at least one additional phase including at least one additional shared inductor; wherein
   the at least one additional shared inductor is connected in parallel with the first and second shared inductors.

5. The LLC resonant converter of claim 1, wherein:
   the first shared inductor is the first resonant inductor; and
   the second shared inductor is the second resonant inductor.

* * * * *